(12) United States Patent
Guido et al.

(10) Patent No.: US 10,554,959 B2
(45) Date of Patent: Feb. 4, 2020

(54) DISPLAY DEVICE

(71) Applicant: NINTENDO CO., LTD., Kyoto (JP)

(72) Inventors: Sebastien Guido, Paris (FR); Janos Boudet, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 508 days.

(21) Appl. No.: 14/755,316

(22) Filed: Jun. 30, 2015

(65) Prior Publication Data

US 2016/0323568 A1 Nov. 3, 2016

(30) Foreign Application Priority Data

Apr. 30, 2015 (JP) ................................. 2015-093093

(51) Int. Cl.
*H04N 13/31* (2018.01)
*H04N 13/324* (2018.01)
(Continued)

(52) U.S. Cl.
CPC ......... *H04N 13/31* (2018.05); *G02B 27/2214* (2013.01); *G09G 3/207* (2013.01);
(Continued)

(58) Field of Classification Search
CPC ........... H04N 13/0409; H04N 13/0497; H04N 13/0422; H04N 13/31; H04N 13/324;
(Continued)

(56) References Cited

U.S. PATENT DOCUMENTS

2011/0018977 A1* 1/2011 Nakamaru ......... H04N 13/0033
348/51
2011/0216061 A1* 9/2011 De La Barre ........... G06T 15/00
345/419
(Continued)

FOREIGN PATENT DOCUMENTS

GB 2415850 1/2006
JP 2012-182569 9/2012

OTHER PUBLICATIONS

Extended European Search Report dated Sep. 28, 2016 issued in corresponding European Patent Application No. 15177642.4, 9 pages.

*Primary Examiner* — William Boddie
*Assistant Examiner* — Saifeldin E Elnafia
(74) *Attorney, Agent, or Firm* — Nixon & Vanderhye, P.C.

(57) ABSTRACT

In an example display device for displaying a stereoscopic image, plural stereoscopic pixels composed of pixels for right eye and pixels for left eye are arranged in the horizontal direction and the vertical direction. A parallax barrier according to a vertical display mode or a horizontal display mode is formed. The pixel for right eye and the pixel for left eye each include at least one sub pixel for each of red, blue, and green. In the vertical display mode, sub pixels at first intervals in the horizontal direction are not allowed to emit color lights, and sub pixels at second intervals in the vertical direction are allowed to emit color lights. In the horizontal display mode, sub pixels at second intervals in the vertical
(Continued)

direction are not allowed to emit color lights, and sub pixels at first intervals in the horizontal direction are allowed to emit color lights.

26 Claims, 20 Drawing Sheets

(51) Int. Cl.
| | |
|---|---|
| *H04N 13/398* | (2018.01) |
| *G09G 3/20* | (2006.01) |
| *G02B 27/22* | (2018.01) |
| *G09G 3/3208* | (2016.01) |

(52) U.S. Cl.
CPC ......... *H04N 13/324* (2018.05); *H04N 13/398* (2018.05); *G09G 3/2074* (2013.01); *G09G 3/3208* (2013.01); *G09G 2300/0426* (2013.01); *G09G 2300/0443* (2013.01); *G09G 2300/0452* (2013.01); *G09G 2300/0465* (2013.01)

(58) Field of Classification Search
CPC .............. H04N 13/398; G02B 27/2214; G02B 27/2214; G09G 3/207; G09G 3/2074; G09G 3/3208; G09G 2300/0465; G09G 2300/0426; G09G 2300/0443; G09G 2300/0452
See application file for complete search history.

(56) References Cited

U.S. PATENT DOCUMENTS

| | | |
|---|---|---|
| 2012/0050857 A1 | 3/2012 | Lee et al. |
| 2012/0218258 A1 | 8/2012 | Mashitani |
| 2013/0083089 A1 | 4/2013 | Koito et al. |
| 2013/0271510 A1* | 10/2013 | Matsumoto ........ G02B 27/2214 345/690 |
| 2015/0015590 A1* | 1/2015 | Jeong ................... G09G 3/2003 345/502 |

* cited by examiner

DISPLAY DEVICE

CROSS REFERENCE TO RELATED APPLICATION

The disclosure of Japanese Patent Application No. 2015-093093, filed on Apr. 30, 2015, is incorporated herein by reference.

FIELD

The exemplary embodiments relate to a display device for displaying a stereoscopic image.

BACKGROUND AND SUMMARY

Conventionally, there is known a display device capable of 3-dimensional stereoscopic expression for expressing an image that is stereoscopic and realistic. Generally, a stereoscopic image providing 3-dimensional expression is formed by a principle of stereopsis using both eyes. Since both eyes are separated from each other by about 65 mm, an image with a stereoscopic effect can be displayed using binocular parallax.

As a technique for displaying a stereoscopic image, there are known stereoscopic image display of glass type and stereoscopic image display of no-glass type. Of these, as a stereoscopic image display method of no-glass type, there are known a parallax barrier method in which vertical grid-like openings are placed in front of respective images for left and right eyes so that the images are separately observed via the openings, a lenticular method using a lenticular plate formed by semicylindrical lenses arranged in a stripe shape, and an integral photography method using a fly-eye lens plate.

The above methods can also be taken as a parallax method in which stereoscopic images for left eye and right eye (left-eye viewpoint image and right-eye viewpoint image) are configured to be separately visible, thereby realizing a 3-dimensional image. Of the above methods, for example, in the parallax barrier method, a parallax barrier is placed which has slit-like openings vertically or horizontally formed being opposed to a surface of display elements on which image information for left eye and right eye is displayed, so that an image that should enter a left eye is shut out of a right eye and an image that should enter a right eye is shut out of a left eye, thereby eventually allowing a user to view a 3-dimensional stereoscopic image owing to binocular parallax.

In the above display devices, one pixel is composed of sub pixels for a plurality of colors such as RGB. For example, there is known a stereoscopic image display device having sub pixels of RGB repeatedly arranged in the vertical direction. There is also known a stereoscopic image display device having stripe-like barriers set in the vertical direction and the horizontal direction so that a stereoscopic image is visible even when a screen is turned by 90 degrees.

In the stereoscopic image display device having vertical and horizontal barriers as described above, since sub pixels of RGB are repeatedly arranged in the vertical direction, there is a problem that, for example, when a screen is viewed being turned by 90 degrees (for example, when a screen is viewed with its mode switched from a portrait mode to a landscape mode), increase/decrease rates of amounts of RGB entering a right eye and a left eye are different. Specifically, first, it will be assumed that a screen is viewed in a portrait mode (vertical mode screen). On this screen, it will be assumed that sub pixels are arranged in order of R, G, then B in the vertical direction (as seen from observer's eyes). When such a screen is viewed, it will be assumed that the positions of both eyes slightly move (shift) leftward or rightward from an appropriate position (for example, an exactly front position) for the observer to view stereoscopic display. For example, if the positions slightly shift leftward, the parallax barrier appears to be shifted rightward as a whole. That is, the parallax barrier overlaps on a part of the sub pixel. Even in such a case, in the portrait mode, since the sub pixels of RGB are arranged in the vertical direction, degrees to which the parallax barrier overlaps on the sub pixels of RGB are equal. Therefore, amounts of red, green, and blue entering a right eye and left eye decrease or increase at the same rate.

On the other hand, it will be assumed that a screen is turned by 90 degrees from the above state and the screen is viewed in the landscape mode. In this case, the sub pixels are arranged in order of R, G, then B in the horizontal direction as seen from the observer. That is, sub pixels for each of red, green and blue are arranged in one line in the vertical direction as seen from the observer. Then, it will be assumed that, from such a state, the positions of both eyes slightly move leftward from an appropriate position for the observer to view stereoscopic display as described above (the parallax barrier appears to be shifted rightward as a whole). In this case, in an image viewed by the observer, among sub pixels of red, green, and blue, an area of a blue sub pixel B increases, and conversely, an area of a red sub pixel R decreases, whereby the image is tinged with blue. As a result, for example, even if white is expressed using such pixels, proper white is not obtained as compared to the case of portrait mode. That is, a problem that a color display quality is deteriorated arises.

Therefore, the exemplary embodiments will be given to describe a display device capable of displaying a stereoscopic image such that the stereoscopic image is visible even if a screen is changed from a predetermined orientation, while maintaining a color display quality in a preferred state before and after the change.

Configuration examples to achieve the above are as follows.

One configuration example is a display device for displaying a stereoscopic image composed of an image for right eye and an image for left eye. The display device includes an image display portion, a display mode setting portion, a parallax barrier forming portion, and an image control portion. The image display portion has a plurality of stereoscopic pixels each composed of a pixel for right eye and a pixel for left eye, the plurality of stereoscopic pixels being arranged in a horizontal direction and in a vertical direction. The display mode setting portion is configured to set one of at least a vertical display mode and a horizontal display mode. The parallax barrier forming portion is configured to form a parallax barrier in accordance with the setting by the display mode setting portion. The image control portion is configured to control the image display portion in accordance with the setting by the display mode setting portion. The pixel for right eye and the pixel for left eye each include at least one sub pixel for each of red, blue, and green. The image control portion is configured to, when the vertical display mode is set, not allow the sub pixels at first intervals in the horizontal direction to emit color lights, but allow the sub pixels at second intervals in the vertical direction to emit color lights, and when the horizontal display mode is set, not allow the sub pixels at the second intervals in the vertical direction to emit color lights, but allow the sub pixels at the first intervals in the horizontal direction to emit color lights.

In another configuration example, control for allowing or not allowing color light emission by the image control portion may be performed on sub pixels for one of red, blue, and green. Further, the color of such sub pixels may be green.

In another configuration example, in each of the pixel for right eye and the pixel for left eye, the number of sub pixels for a color for which control for allowing or not allowing color light emission is performed by the image control portion may be larger than the respective numbers of sub pixels for the other colors. Further, a total area of such sub pixels may be greater than respective total areas of sub pixels for the other colors.

In another configuration example, in the stereoscopic pixel, in each of a column and a row in which sub pixels for a color for which control for allowing or not allowing color light emission is performed by the image control portion are located, sub pixels for the other colors may not be located.

In another configuration example, in the stereoscopic pixel, in each of a column and a row that are respectively adjacent to each of a column and a row in which only sub pixels for a color for which control for allowing or not allowing color light emission is performed by the image control portion are located, at least one sub pixel for each of red, blue, and green may be located.

In another configuration example, the image control portion may be configured to, when the vertical display mode is set, not allow sub pixels in columns present at the first intervals in the horizontal direction to emit color lights, but allow sub pixels in rows present at the second intervals in the vertical direction to emit color lights, and when the horizontal display mode is set, not allow sub pixels in columns present at the second intervals in the vertical direction to emit color lights, but allow sub pixels in rows present at the first intervals in the horizontal direction to emit color lights.

In another configuration example, the image control portion may be configured to, when the vertical display mode is set, not allow sub pixels at even-numbered locations in the horizontal direction to emit color lights, but allow sub pixels at even-numbered locations in the vertical direction to emit color lights, and when the horizontal display mode is set, not allow sub pixels at even-numbered locations in the vertical direction to emit color lights, but allow sub pixels at even-numbered locations in the horizontal direction to emit color lights. Alternatively, the image control portion may be configured to, when the vertical display mode is set, not allow sub pixels at odd-numbered locations in the horizontal direction to emit color lights, but allow sub pixels at odd-numbered locations in the vertical direction to emit color lights, and when the horizontal display mode is set, not allow sub pixels at odd-numbered locations in the vertical direction to emit color lights, but allow sub pixels at odd-numbered locations in the horizontal direction to emit color lights.

In another configuration example, the stereoscopic pixel may be configured such that at least four sub pixels can be arranged in each of the horizontal direction and the vertical direction.

In another configuration example, a width of each sub pixel for a color for which control for selectively allowing or not allowing color light emission is performed by the image control portion may be smaller than widths of sub pixels for the other colors.

In another configuration example, a width of each sub pixel for a color for which control for selectively allowing or not allowing color light emission is performed by the image control portion may be substantially the same as widths of sub pixels for the other colors.

In another configuration example, at least one vacant region in which no sub pixel is located may be present adjacent to each sub pixel for a color for which control for selectively allowing or not allowing color light emission is performed by the image control portion.

In another configuration example, at least one sub pixel that is not allowed to emit color light at least when a stereoscopic image is displayed may be located adjacent to each sub pixel for a color for which control for selectively allowing or not allowing color light emission is performed by the image control portion.

In another configuration example, the stereoscopic pixel may include at least one sub pixel for a color other than red, blue, and green. The color of the sub pixel other than red, blue, and green may be at least either yellow or white.

In another configuration example, the first interval and the second interval may be the same interval.

In another configuration example, in the stereoscopic pixel, the sub pixels are arranged such that sub pixels positioned substantially symmetrically with respect to a diagonal line extending from an upper left to a lower right or an upper right to a lower left in the stereoscopic pixel may have the same color.

In another configuration example, in the stereoscopic pixel, the sub pixels may be arranged such that sub pixels positioned substantially point-symmetrically with respect to a specific position in the stereoscopic pixel have the same color.

In another configuration example, the sub pixels may be arranged such that an arrangement order in a predetermined direction of sub pixels for red, blue, and green in one of the pixel for right eye and the pixel for left eye is different from an arrangement order in the predetermined direction of sub pixels for red, blue, and green in the other one.

In another configuration example, starting from an upper left or an upper right in the stereoscopic pixel, at least one sub pixel for each of red, blue, and green may be arranged in a predetermined order in the horizontal direction, and at least one sub pixel for each of red, blue, and green may be arranged in the same order as the predetermined order, in the vertical direction.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels each composed of a plurality of viewpoint pixels, the stereoscopic pixels being arranged in a horizontal direction and in a vertical direction. The image control portion is configured to control the image display portion. Each of the plurality of viewpoint pixels is composed of a plurality of sub pixels that include at least sub pixels for a first basic color and a second basic color that serve as a base for expressing a color. The image control portion is configured to perform control for selectively allowing or not allowing color light emission, for sub pixels present at predetermined intervals in the horizontal direction and in the vertical direction.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels each composed of a plurality of viewpoint pixels, the stereoscopic pixels being arranged in a horizontal direction and in a vertical direction. The image control portion is configured to control the image display portion. Each of the plurality of viewpoint pixels is composed of a plurality of sub pixels. The stereoscopic pixel includes at least one sub pixel for each of red, blue, and green, the sub pixels being arranged such that sub pixels positioned substantially symmetrically with respect to a diagonal line extending from an upper left to a lower right or an upper right to a lower left in the stereoscopic pixel have the same color.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels each composed of a plurality of viewpoint pixels, the stereoscopic pixels being arranged in a horizontal direction and in a vertical direction. The image control portion is configured to control the image display portion. Each of the plurality of viewpoint pixels is composed of a plurality of sub pixels. The stereoscopic pixel includes at least one sub pixel for each of red, blue, and green, the sub pixels being arranged such that sub pixels positioned substantially point-symmetrically with respect to a specific position in the stereoscopic pixel have the same color.

Another configuration example is a display device for displaying a stereoscopic image composed of an image for right eye and an image for left eye. The display device includes an image display portion and an image control portion. The image display portion has a plurality of stereoscopic pixels each composed of a pixel for right eye and a pixel for left eye, the plurality of stereoscopic pixels being arranged in a horizontal direction and in a vertical direction. The image control portion is configured to control the image display portion. The pixel for right eye and the pixel for left eye each includes at least one sub pixel for each of red, blue, and green. The sub pixels are arranged such that an arrangement order in a predetermined direction of sub pixels for red, blue, and green in one of the pixel for right eye and the pixel for left eye is different from an arrangement order in the predetermined direction of sub pixels for red, blue, and green in the other one. In this case, an arrangement order in a predetermined direction of sub pixels for red, blue, and green in one of the pixel for right eye and the pixel for left eye may be the same as an arrangement order, in a direction perpendicular to the predetermined direction, of sub pixels for red, blue, and green in the stereoscopic pixel composed of the pixel for right eye and the pixel for left eye.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels each composed of a plurality of viewpoint pixels, the stereoscopic pixels being arranged in a horizontal direction and in a vertical direction. The image control portion is configured to control the image display portion. The stereoscopic pixel at least includes one sub pixel for red, one sub pixel for blue, and two sub pixels for green. A first sub pixel for green is located between the sub pixel for red and the sub pixel for blue. A second sub pixel for green is located outward of the sub pixel for red and the sub pixel for blue. A sum of sizes of the first sub pixel for green and the second sub pixel for green is the same as a size of the sub pixel for red or blue.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels arranged in a horizontal direction and in a vertical direction. The image control portion is configured to control the image display portion. Each of the plurality of stereoscopic pixels is composed of a plurality of regions arranged in the horizontal direction and in the vertical direction, the regions each including a plurality of sub pixels that include at least sub pixels for a first basic color and a second basic color that serve as a base for expressing a color. The image control portion is configured to perform control for selectively allowing or not allowing color light emission, on a region-by-region basis, for sub pixels included in the regions present at predetermined intervals in the horizontal direction and in the vertical direction. In this case, each of the plurality of regions may be a four-row four-column region in the stereoscopic pixel. Alternatively, a width of each region for which the control for selectively allowing or not allowing color light emission is performed by the image control portion may be substantially equal to or substantially half a width of each region for which the control for selectively allowing or not allowing color light emission is not performed by the image control portion.

Another configuration example is a display device for displaying a stereoscopic image composed of a plurality of viewpoint images corresponding to a plurality of viewpoints. The display device includes an image display portion and an image control portion. The image display portion has a plurality of stereoscopic pixels each composed of a plurality of viewpoint pixels, the stereoscopic pixels being arranged in a horizontal direction and in a vertical direction. The image control portion is configured to control the image display portion. Each of the plurality of viewpoint pixels is composed of a plurality of sub pixels. Starting from an upper left or an upper right in the stereoscopic pixel, at least one sub pixel for each of red, blue, and green is arranged in a predetermined order in the horizontal direction, and at least one sub pixel for each of red, blue, and green is arranged in the same order as the predetermined order, in the vertical direction.

Another configuration example is a display device for displaying a stereoscopic image composed of an image for right eye and an image for left eye. The display device includes an image display portion and an image control portion. The image display portion has a plurality of stereoscopic pixels each composed of a pixel for right eye and a pixel for left eye, the plurality of stereoscopic pixels being arranged in a horizontal direction and in a vertical direction. The image control portion is configured to control the image display portion. The pixel for right eye and the pixel for left eye each includes at least one sub pixel for each of red, blue, and green arranged in the vertical direction. A region having a predetermined width is provided between the sub pixel arranged in the vertical direction in the pixel for right eye and the sub pixel arranged in the vertical direction in the pixel for left eye. At least one sub pixel for one of red, blue, and green is located in the region having the predetermined width. The image control portion may perform control for allowing or not allowing color light emission, on the sub pixel located in the region having the predetermined width. The number of the sub pixel located in the region having the predetermined width may be less than the number of the at least one sub pixel for red, blue, or green arranged in the vertical direction.

According to the exemplary embodiments, it becomes possible to provide a display device that allows a stereoscopic image to be visible even if a screen is changed from a predetermined orientation, while maintaining a color display quality in a preferred state before and after the change.

DETAILED DESCRIPTION OF NON-LIMITING EXAMPLE EMBODIMENTS

Figure 1:
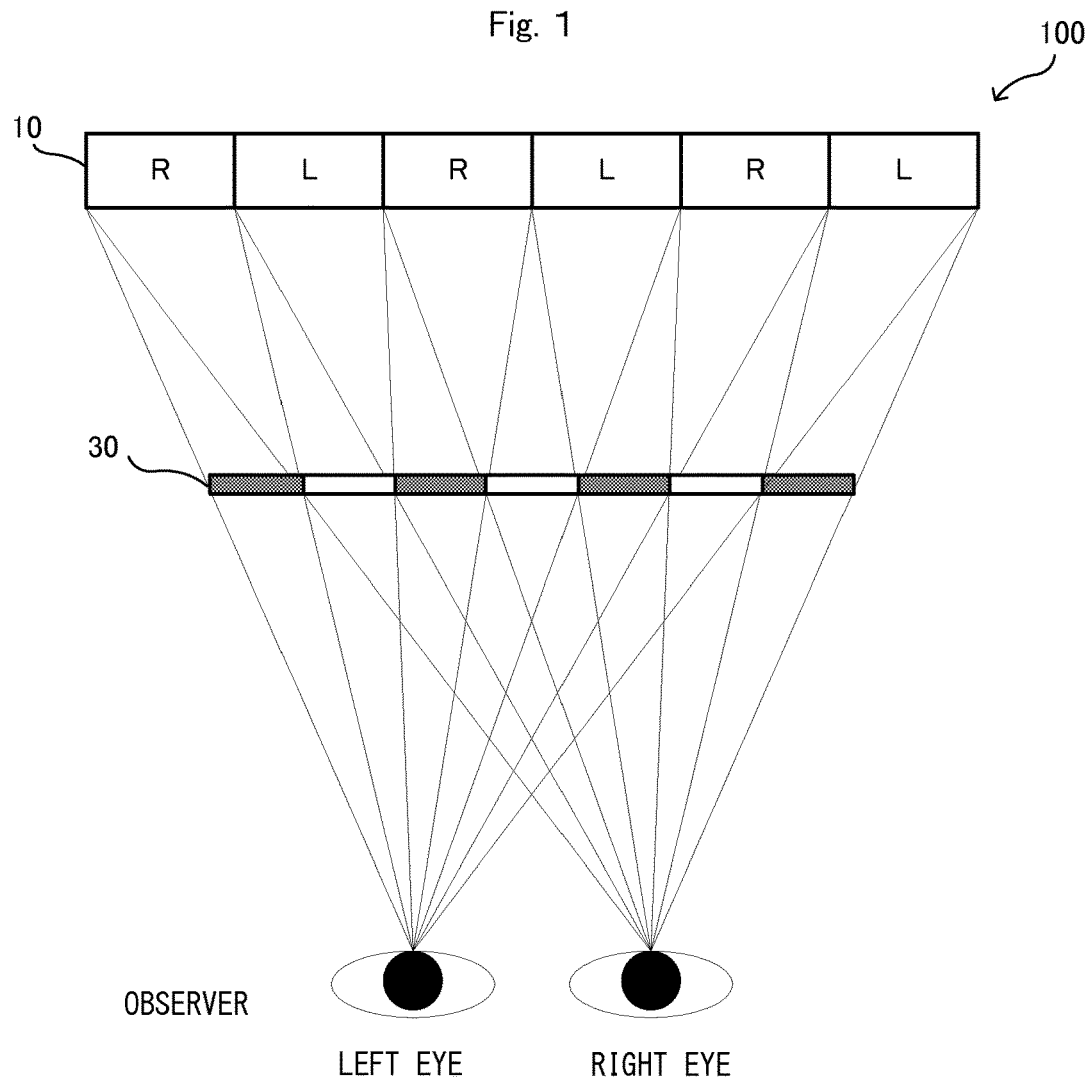
FIG. 1 is a schematic diagram showing a non-limiting example of a display device 100 according to the exemplary embodiments.

Hereinafter, non-limiting example embodiments will be described.

A stereoscopic image display device (hereinafter, simply referred to as a display device) according to the present embodiment displays a stereoscopic image composed of a plurality of viewpoint images corresponding to a plurality of viewpoints. The display device includes an image display portion having a plurality of viewpoint pixels arranged in the horizontal direction and the vertical direction, and an image control portion configured to control the image display portion. The plurality of viewpoint pixels are each composed of sub pixels arranged in patterns described later. The image control portion controls the image display portion so as to sequentially displaying a plurality of viewpoint images along the horizontal direction, using a plurality of "stereoscopic pixels" each of which is composed of, as a unit, a plurality of viewpoint pixels adjacent in the horizontal direction.

The display device is a plasma display, an organic EL display, a MEMS display, a liquid crystal display, or the like. In the present embodiment, an example in which the display device is a liquid crystal display will be described.

It can also be assumed that the display device is applied to a hand-held terminal typified by a mobile phone, a smartphone, or the like. Therefore, as used herein, terms "horizontal direction" and "vertical direction" may not strictly mean the horizontal direction and the vertical direction, depending on the way to use the hand-held terminal. For example, as used herein, the term "horizontal direction" means a direction in which a line connecting a left eye and a right eye of an observer extends. For example, as used herein, the term "vertical direction" means a direction perpendicular to the horizontal direction.

In the case of hand-held terminal, with regard to the orientation of a screen, it can be assumed that the screen (display device itself) is turned right or left by 90 degrees, to be viewed. In the present embodiment, a horizontally long screen (so-called landscape display) whose long-side direction coincides with (or almost coincides with) the horizontal direction when an observer views the screen is referred to as a "horizontal screen". A vertically long screen (so-called portrait display) whose long-side direction coincides with (or almost coincides with) the vertical direction is referred to as a "vertical screen". In the present embodiment, the case where the display device is used in a "vertical screen" state is defined as a normal state. That is, it will be assumed that, normally, an observer views the display device in a "vertical screen" state, and the display device may be used being held or placed in a "horizontal screen" state as necessary. Hereinafter, unless otherwise noted, the description will be given with the screen assumed to be in a "vertical screen" state (with reference to a "vertical screen" state). Some of the drawings used for the following description use concepts of "x-axis direction" and "y-axis direction". As for these, unless otherwise noted, the "x-axis direction" corresponds to the horizontal direction when the display device is in a "vertical screen" state, and the "y-axis direction" corresponds to the vertical direction when the display device is in a "vertical screen".

In the present embodiment, a stereoscopic image is composed of a left-eye viewpoint image and a right-eye viewpoint image. In the case of "vertical screen", pixels composing a left-eye viewpoint image and pixels composing a right-eye viewpoint image are alternately displayed in the horizontal direction. On the other hand, in the case of "horizontal screen", pixels composing a left-eye viewpoint image and pixels composing a right-eye viewpoint image are alternately displayed in a direction that corresponds to the vertical direction when the display device is in a "vertical screen" state. In this case, an observer views the stereoscopic image with the display device turned by 90 degrees. In another embodiment, images for three or more viewpoints may be used so that a plurality of observers can view the stereoscopic image from different viewpoints. With regard to the number of viewpoints, there is known a technique of allowing, for example, two observers to view a stereoscopic image simultaneously. In this case, at least four viewpoints are assumed (There are right-eye viewpoints and left-eye viewpoints for two persons, i.e., there are four viewpoints in total. There are two positions where the stereoscopic image can be viewed simultaneously).

First Embodiment

Hereinafter, a display device according to the first embodiment will be described with reference to the drawings. FIG. 1 is a schematic diagram showing a non-limiting example of the display device 100 according to the first embodiment.

As shown in FIG. 1, the display device 100 includes an image display portion 10 and an image separating portion 30.

The image display portion 10 is composed of a plurality of viewpoint pixels (hereinafter, simply referred to as pixels). Each pixel is composed of sub pixels for red, blue, and green. Inside the image display portion 10, a backlight (not shown) is also provided for radiating light from a back side to the plurality of sub pixels.

Figure 2:
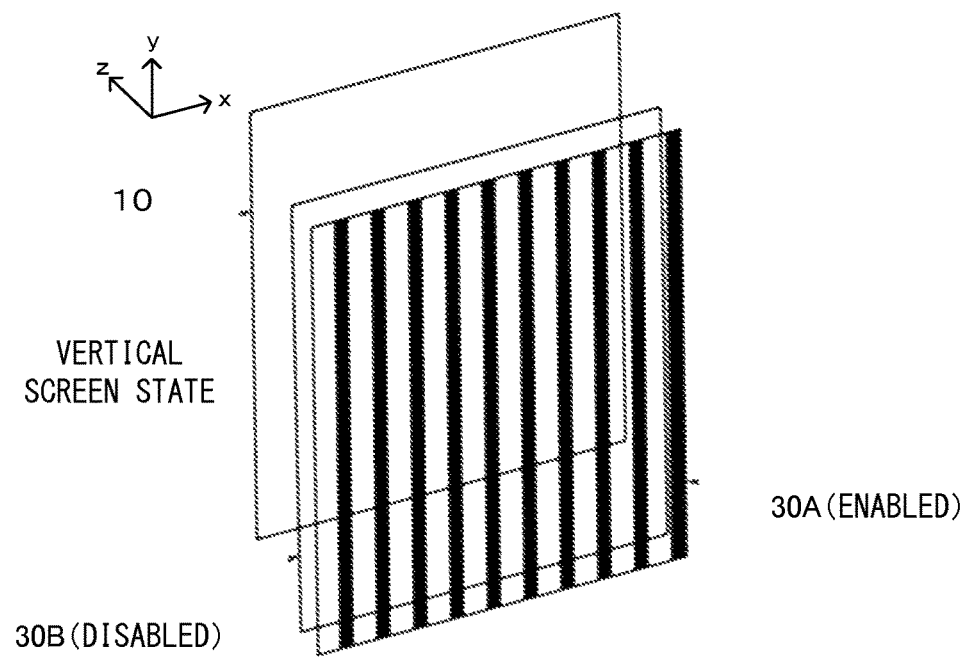
FIG. 2 is a schematic diagram showing a non-limiting example of a concept of control for an image separating portion 30.
Figure 2:
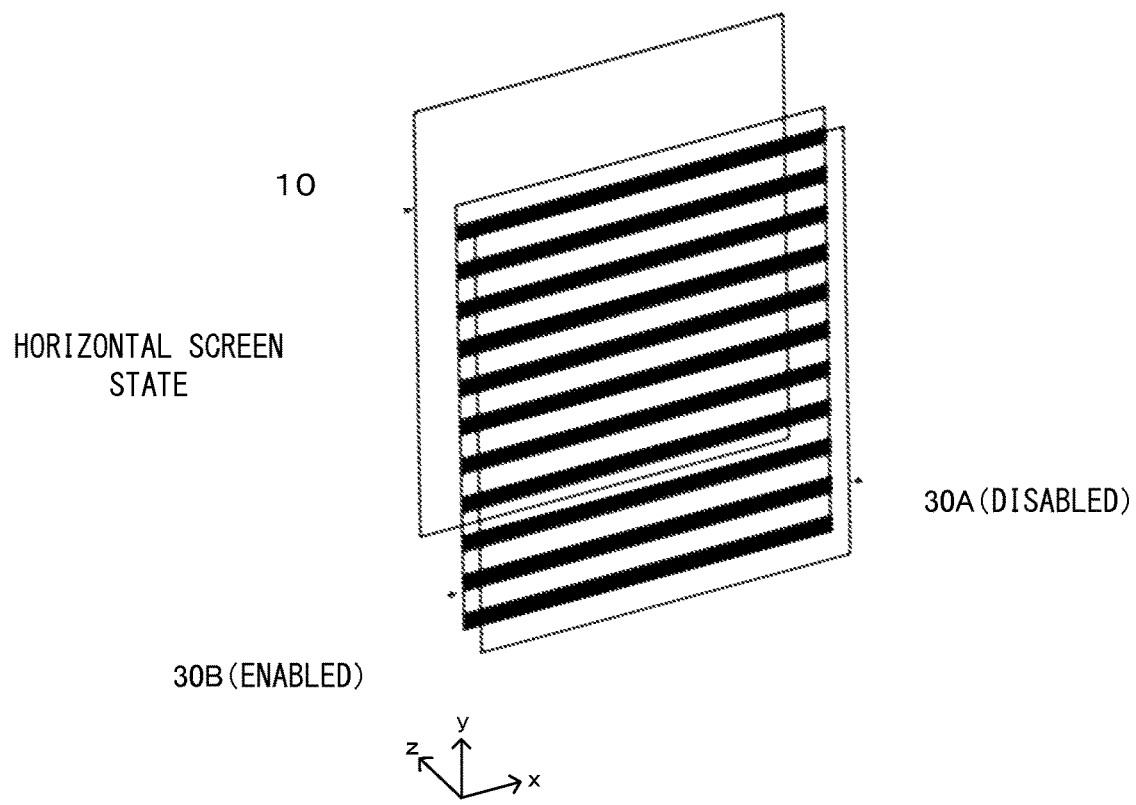

The image separating portion 30 separates image light emitted from pixels (pixels L in the image display portion 10) composing a left-eye viewpoint image (image for left eye), and image light emitted from pixels (pixels R in the image display portion 10) composing a right-eye viewpoint image (image for right eye), from each other. The image separating portion 30 is a parallax barrier, a lenticular lens, or the like. In the present embodiment, the image separating portion 30 is a parallax barrier, as an example. In the present embodiment, the image separating portion 30 has a parallax barrier for "vertical screen" (a parallax barrier extending in the vertical direction as seen in a "vertical screen" state), and a parallax barrier for "horizontal screen" (a parallax barrier extending in the horizontal direction as seen in a "vertical screen" state), and is controlled to be switched therebetween as appropriate in accordance with whether the display device is in a "horizontal screen" state or a "vertical screen" state. FIG. 2 is a schematic diagram showing a non-limiting example of a concept of control for the image separating portion 30 in the present embodiment. In the example in FIG. 2, as seen from an observer, a parallax barrier 30A for vertical screen and a parallax barrier 30B for horizontal screen are placed, overlapping on each other, at a front surface side of the image display portion 10. Both parallax barriers are disabled by default. One of the parallax barriers is enabled as necessary. That is, control is performed so that, in a vertical screen state, the parallax barrier 30A for vertical screen is enabled, and in a horizontal screen state, the parallax barrier 30B for horizontal screen is enabled.

Each of the plurality of sub pixels composing each pixel includes a transparent pixel electrode (not shown), a transparent common electrode (not shown), and an RGB color filter. The transparent pixel electrode and the transparent common electrode are placed being opposed to each other via a liquid crystal (not shown). A thin film transistor (not shown) for switching is connected to the transparent pixel electrode. Through switching operation of the thin film transistor, image signal voltage is applied to the transparent pixel electrode, whereby the sub pixel is driven. A liquid crystal molecule having an optical anisotropy property and a polarization property is excited due to a potential difference occurring between the transparent pixel electrode and the transparent common electrode. A difference in transmittance occurs among liquid crystal molecules in the sub pixels. The plurality of sub pixels emit color lights according to their respective transmittances and the colors of the respective color filters, by receiving light from the backlight.

Figure 3:
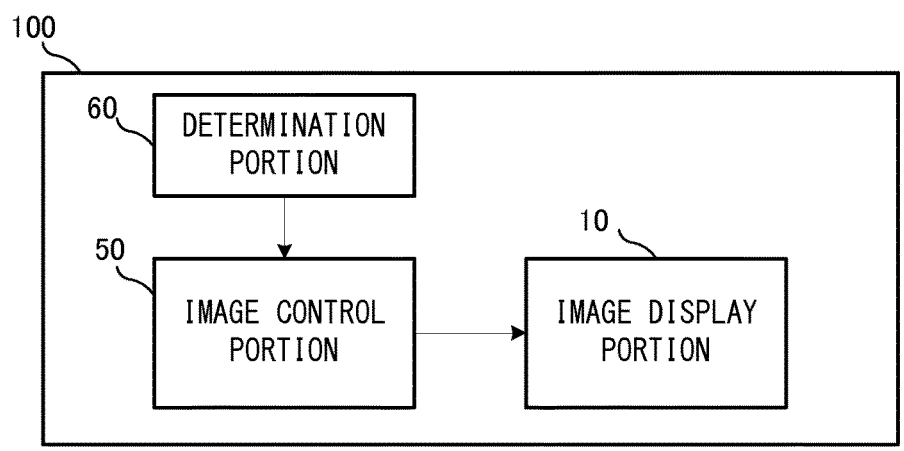
FIG. 3 is a block diagram showing a non-limiting example of the display device 100 according to the exemplary embodiments.

FIG. 3 is a block diagram showing a non-limiting example of the display device 100 according to the first embodiment. As shown in FIG. 3, the display device 100 includes the image display portion 10, the image control portion 50, and a determination portion 60.

The image display portion 10 is composed of a plurality of pixels as described above. Specifically, the image display portion 10 has a plurality of pixels placed in the horizontal direction and the vertical direction.

Here, a plurality of sub pixels (in the present embodiment, sub pixels for three colors of red, green, and blue) compose one pixel (arrangement of the sub pixels will be described later). A plurality of pixels (here, two pixels) adjacent in the horizontal direction compose one stereoscopic pixel.

One of the two pixels composing each stereoscopic pixel is displayed as a pixel forming a left-eye viewpoint image. The other pixel is displayed as a pixel forming a right-eye viewpoint image. That is, left-eye viewpoint images and right-eye viewpoint images are sequentially displayed on a pixel-by-pixel basis along the horizontal direction.

Hereinafter, "R" denotes red, "G" denotes green, and "B" denotes blue.

The image control portion 50 controls the image display portion 10. Specifically, the image control portion 50 controls the image display portion 10 so as to display a plurality of viewpoint images (left-eye viewpoint image and right-eye viewpoint image) alternately along the horizontal direction, using a plurality of pixels.

In addition, the image control portion 50 performs control so that only some of the sub pixels composing each pixel are allowed to emit color lights, and the other sub pixels are not allowed to emit color lights. Although described later in detail, the image control portion 50 performs control so that, of the sub pixels arranged in the vertical and horizontal directions, sub pixels at even-numbered locations are not allowed to emit color lights, and sub pixels at odd-numbered locations are allowed to emit color lights. Alternatively, a pixel may be divided into a plurality of "regions", and the control for allowing or not allowing color light emission may be performed on a region-by-region basis. In this case, the number of sub pixels located in each region is not limited to one, but a plurality of sub pixels may be located in each region. The sub pixels included in each region may be collectively targeted for the color light emission control. That is, in the above control, the control target may be each individual "sub pixel", or may be each region (which can include a plurality of sub pixels). In the following description, basically, an example in which the control target is each individual sub pixel will be described. However, for reference, in an "arrangement pattern 1" described later, an example in which the control target is each region will be also described.

In the present embodiment, sub pixels that are "not allowed to emit color lights" in the above control are not allowed to emit color lights no matter what image the display device 100 displays.

The display device 100 also has the determination portion 60 for determining whether a screen is in a "horizontal screen" state or in a "vertical screen" state as described above (in other words, determining the orientation of the screen or the orientation of the display device 100). As the determination method, a known method may be used. For example, the display device 100 may be provided with an acceleration sensor, and the orientation of the display device 100 may be calculated based on a result of detection by the acceleration sensor, whereby whether the screen is in a "horizontal screen" state or in a "vertical screen" state may be determined. The determination portion 60 outputs the determination result to the image control portion 50. The image control portion 50 performs control for sub pixels as described later, based on the determination result (that is, whether the screen is in a "horizontal screen" state or in a "vertical screen" state) sent from the determination portion. In addition, based on the determination result, the image control portion 50 also performs control for switching between enabling and disabling of the parallax barrier for horizontal screen and the parallax barrier for vertical screen. In the present embodiment, the image control portion 50 switches a display control mode between two modes in accordance with a result outputted from the determination portion, and controls the image display portion 10 in accordance with the mode. Specifically, if the output from the determination portion 60 indicates a "horizontal screen", the image control portion 50 sets the display control mode to a "horizontal display mode". On the other hand, if the output indicates a "vertical screen", the image control portion 50 sets the display control mode to a "vertical display mode". Then, the image control portion forms a parallax barrier according to the display control mode. That is, in the "horizontal display mode", the image control portion performs control to disable the parallax barrier for vertical screen, and in the "vertical display mode", the image control portion performs control to disable the parallax barrier for horizontal screen.

In another embodiment, instead of using the determination portion 60, the "horizontal display mode" and the "vertical display mode" may be switched by an observer's predetermined operation, for example. For example, the "horizontal display mode" and the "vertical display mode" may be switched in accordance with an observer's operation such as operation of a slidable switch for switching between both modes, an operation for setting a screen direction on a predetermined setting screen, or the like.

Next, arrangement of sub pixels in a stereoscopic pixel according to the first embodiment will be described. In the present embodiment, sub pixels for three primary colors of RGB are arranged in arrangement patterns described below. As an example, seven arrangement patterns will be described below. Owing to these arrangement patterns and color light emission control described below, in the present embodiment, the amounts of red light, green light, and blue light entering a right eye and a left eye can be made equal both when the screen is viewed in a "vertical screen" state and when the screen is viewed in a "horizontal screen". In other words, the sub pixels are arranged so that the ratio (proportion) of red, green, and blue in each pixel becomes constant irrespective of whether the screen is viewed horizontally or vertically. As a result, even if an observer is not at an ideal position for stereoscopic viewing, the observer can view a stereoscopic image.

(Arrangement Pattern 1)

Figure 4:
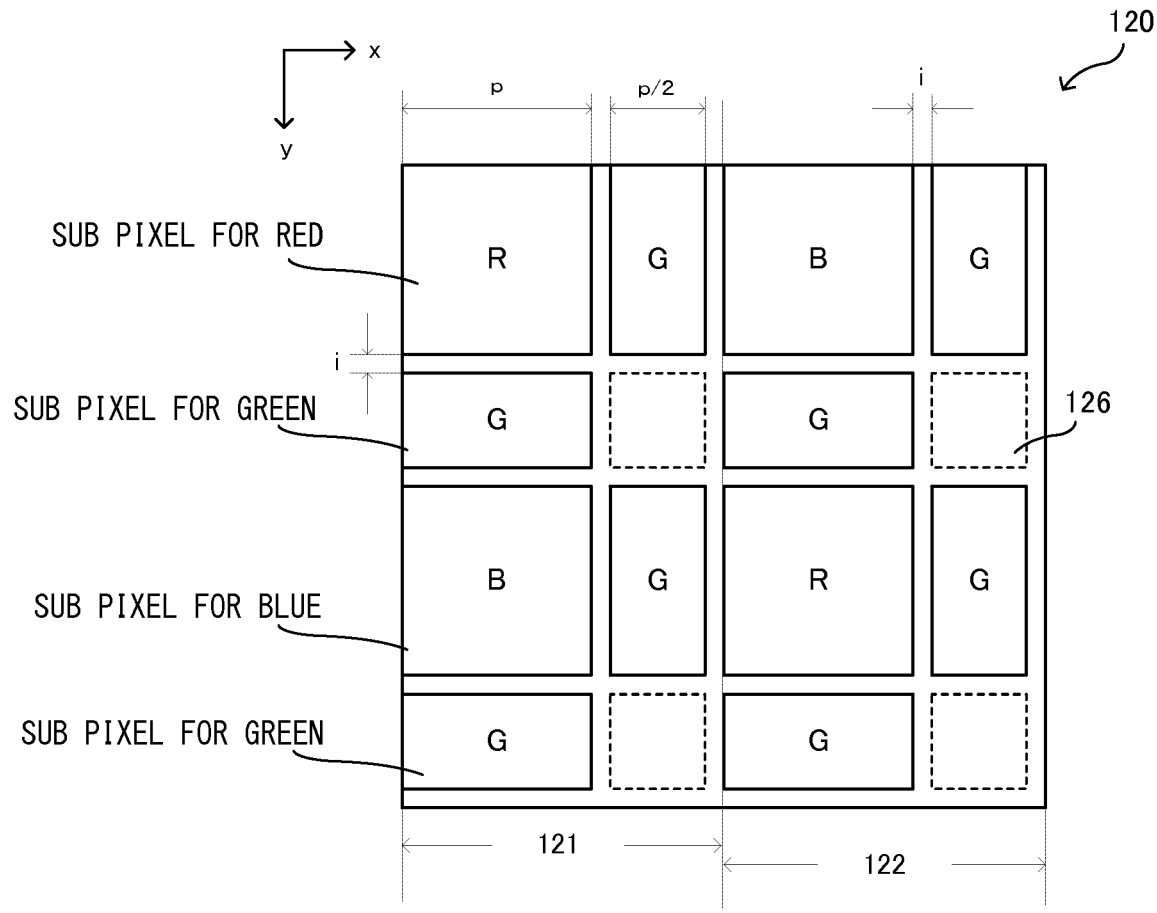
FIG. 4 is a diagram showing a non-limiting example of an arrangement pattern 1 of sub pixels in a stereoscopic pixel.

FIG. 4 is a diagram showing a non-limiting example of arrangement of sub pixels in a stereoscopic pixel 120 according to the first embodiment. Hereinafter, the arrangement pattern shown in FIG. 4 is referred to as an "arrangement pattern 1". In FIG. 4, the case where the screen is a "vertical screen" is shown.

The stereoscopic pixel 120 shown in FIG. 4 is composed of two pixels 121 and 122 adjacent in the horizontal direction as described above. In FIG. 4, the pixel 121 is a pixel for right eye, and the pixel 122 is a pixel for left eye. Since FIG. 4 shows the case of "vertical screen" as described above, in the case of "horizontal screen", allocation of the pixel for right eye and the pixel for left eye is changed as appropriate in accordance with turning by 90 degrees.

In the example in FIG. 4, the pixel for right eye 121 and the pixel for left eye 122 each include six sub pixels, and a total number of sub pixels included in the stereoscopic pixel 120 is twelve. In each of the pixel for right eye 121 and the pixel for left eye 122, sub pixels are arranged in two columns in the vertical direction (y-axis direction) and in four rows in the horizontal direction (x-axis direction). In one stereoscopic pixel 120, sub pixels are arranged in four columns and four rows. That is, the stereoscopic pixel 120 is configured such that at least four sub pixels can be arranged in each column or each row. In each pixel, the number of sub pixels of G is more than the number of sub pixels of R or B.

In the following description, a "row" corresponds to arrangement in the x-axis direction (right-left direction) on the screen in a "vertical screen" state, and a "column" corresponds to arrangement in the y-axis direction (up-down direction).

In FIG. 4, in the pixel for right eye 121, first, in a left column (the first column in the stereoscopic pixel 120 as a whole), four sub pixels are arranged in order of R, G, B, then G along the vertical direction (y-axis direction). In a right column (the second column in the stereoscopic pixel 120 as a whole), one sub pixel of G is located at each position adjacent to the sub pixel of R or B. In other words, a sub pixel of G is located between a sub pixel of R and a sub pixel of B while the sub pixels of G are not adjacent to each other. A vacant region 126 (in FIG. 4, a region indicated by a dotted square) in which no sub pixel is located is present between the sub pixel of G and the sub pixel of G. In addition, a vacant region 126 is also present in the fourth row of this column.

On the other hand, in the pixel for left eye 122, in a left column (the third column in the stereoscopic pixel 120 as a whole), four sub pixels are arranged in order of B, G, R, then G along the vertical direction. That is, as compared to the left column in the pixel for right eye 121, the order of R and G is reversed. In a right column (the fourth column in the stereoscopic pixel 120 as a whole) in the pixel for left eye 122, as in the above pixel for right eye 121, one sub pixel of G is located at each position adjacent to the sub pixel of R or B. A vacant region 126 is present between the sub pixel of G and the sub pixel of G. In addition, a vacant region 126 is also present in the fourth row in this column.

In the pixel for right eye 121 as a whole or the pixel for left eye 122 as a whole, it can be said that a first sub pixel of G (i.e., the sub pixel of G in the left column) is located between the sub pixel of R and the sub pixel of B, and a second sub pixel of G (i.e., the sub pixel in the right column) is located outward of the sub pixel of R or the sub pixel of B. In the stereoscopic pixel 120 as a whole (or in an entire image formed by collection of a plurality of stereoscopic pixels 120), the second sub pixel of G located outward of the sub pixel of R or the sub pixel of B is located between the sub pixel of R and the sub pixel of B.

In the stereoscopic pixel 120 as a whole, the arrangement order of RGB in the first row and the arrangement order of RGB in the first column are the same, i.e., R, G, B, then G. That is, in both the vertical direction and the horizontal direction, the sub pixels are arranged in order of R, G, B, then G (namely, the same order), starting from the sub pixel positioned at the upper left in the stereoscopic pixel 120. Regarding the breakdown of the numbers of sub pixels, as described above, the number of sub pixels of G is more than the number of sub pixels of R or B. Specifically, the number of R is two, the number of B is two, and the number of G is four.

The pixel for right eye and the pixel for left eye each include at least one sub pixel for each of red, blue, and green.

In the stereoscopic pixel 120 as a whole, at least one sub pixel for each of R, G, and B is included in the first column and in the third column, but only sub pixels of G are located in the second column and in the fourth column. As for each row, at least one sub pixel for each of R, G, and B is included in the first row and in the third row, and only sub pixels of G are located in the second row and in the fourth row. Such sub pixels in the even-numbered columns and in the even-numbered rows are targets of control for allowing or not allowing color light emission as described later. In other words, a sub pixel for a color that is not targeted for the later-described control for allowing or not allowing color light emission is not located in the even-numbered column or the even-numbered row.

Here, the horizontal width of a sub pixel will be described. In the arrangement pattern 1, in each of a vertical screen state and a horizontal screen state, the widths of sub pixels in the horizontal direction as seen from an observer are set such that the ratio of the horizontal width of each sub pixel of R and B and the horizontal width of each sub pixel of G is 2:1. The ratio of the horizontal widths is not limited thereto. For example, the ratio of the horizontal width of each sub pixel of R and B and the horizontal width of each sub pixel of G may be set at 1:1 (for example, an arrangement pattern 2 described later). As a matter of course, other ratios may be used. Further, the ratio of the widths of sub pixels in the horizontal direction as seen from an observer may differ between a vertical screen state and a horizontal screen state (for example, an arrangement pattern 5 described later).

Next, an area (size) of each sub pixel will be described. In the arrangement pattern 1, a sub pixel of R and a sub pixel of B have the same area. An area of a sub pixel of G is half the area of the sub pixel of R or B. In the example in FIG. 4, each sub pixel of R and B is a square having a side with a length of p. On the other hand, a sub pixel of G is a rectangle having a long side with the length of p and a short side with half (p/2) the length of p (it is noted that, in a horizontal screen state, the short side of the sub pixel of G is parallel to the x axis (horizontal direction)). Therefore, the area of a sub pixel of G is half the area of a sub pixel of R or B. In other words, in one pixel, a sum of the areas of two sub pixels of G is equal to the area of a sub pixel of R or B. The number of sub pixels of G is twice the total number of sub pixels of R and B. Therefore, in one pixel, areas occupied by the respective sub pixels of R, G, and B are the same. In the arrangement pattern 1, an area of the vacant region 126 is ¼ of the area of a sub pixel of R or B.

In addition, the sub pixels in the arrangement pattern 1 are arranged such that sub pixels positioned substantially line-symmetrically with respect to a diagonal line extending from the upper left to the lower right in the stereoscopic pixel 120 have the same color.

Next, control for the stereoscopic pixel 120 in which sub pixels are arranged as described above will be described. The image control portion 50 performs control for allowing or not allowing any sub pixel of G in each pixel in accordance with whether the screen is a "vertical screen" or a "horizontal screen" (a determination result from the determination portion 60). Specifically, in the case of "vertical screen", controls is performed so that, in the horizontal direction, sub pixels at first intervals are not allowed to emit color lights, and in the vertical direction, sub pixels at second intervals are allowed to emit color lights. On the other hand, in the case of "horizontal screen", controls is performed so that, in the vertical direction, sub pixels at the second intervals are not allowed to emit color lights, and in the horizontal direction, sub pixels at the first intervals are allowed to emit color lights.

More specifically, control is performed so that, in the stereoscopic pixel 120, sub pixels located in even-numbered rows or columns (corresponding to the first intervals and the second intervals) starting from the sub pixel at the upper left are selectively allowed or not allowed to emit color lights in accordance with whether or not the screen is a vertical screen or a horizontal screen. In other words, control is performed so that, in the arrangement order of the sub pixels, even-numbered sub pixels are selectively allowed or not allowed to emit color lights. In the example of the present embodiment, in both the case of "horizontal screen" and the case of "vertical screen", control is performed such that sub pixels present in a column in which sub pixels are arranged in the vertical direction as seen from observer's eyes (a "column" as seen from the observer's viewpoint, or an array along a longitudinal direction of a parallax barrier used in the present screen state) and in which sub pixels of R and B are not present, are not allowed to emit color lights.

Figure 5:
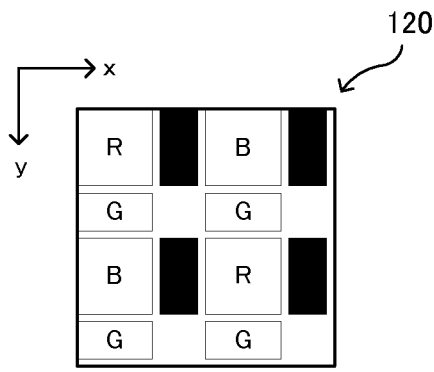
FIG. 5 is a schematic diagram showing a non-limiting example of control using the arrangement pattern 1 in the case of vertical screen.

The above control will be described with reference to FIGS. 5 and 6. FIG. 5 is a diagram showing a non-limiting example of a color light emission state of the stereoscopic pixel 120 in the case where the image control portion 50 operates in a "vertical display mode". In FIG. 5, starting from a sub pixel located at the upper left in the stereoscopic pixel 120, sub pixels of G located in the second column and the fourth column are not allowed to emit color lights (Sub pixels in filled areas do not emit color lights. The same applies hereinafter.). This can be considered to be control of not allowing sub pixels in even-numbered columns to emit color lights. That is, in the stereoscopic pixel 120, only sub pixels of R, G, B, and then G in the first column and sub pixels of B, G, R, and then G in the third column (corresponding to the first column in the pixel for left eye 122) emit color lights. In other words, control is performed so that sub pixels of G at even-numbered locations as counted from the left end of the stereoscopic pixel 120 are not allowed to emit color lights. Thus, not allowing even-numbered columns to emit color lights generates some regions that do not emit color lights in the stereoscopic pixel 120. This enables an observer to view a stereoscopic image even if the observer is not at an ideal position for stereoscopic viewing.

Figure 6:
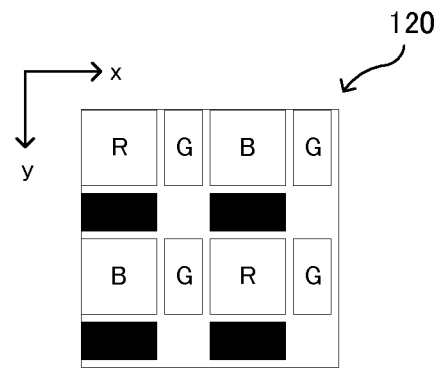
FIG. 6 is a schematic diagram showing a non-limiting example of control using the arrangement pattern 1 in the case of horizontal screen.

On the other hand, in the case where the image control portion 50 operates in a "horizontal display mode", the color light emission state is as shown in FIG. 6. It is noted that, since the screen is in a "horizontal screen" state, a screen obtained by turning right or left the screen shown in FIG. 6 by 90 degrees is actually seen by an observer. In the color light emission control shown in FIG. 6, as compared to the case in FIG. 5, only sub pixels in the first row and the third row which include sub pixels of R and B are allowed to emit color lights. Meanwhile, sub pixels (in FIG. 6, sub pixels of G) in the second row and the fourth row, i.e., in even-numbered rows as counted from above are controlled to be not allowed to emit color lights. In other words, in the stereoscopic pixel 120, sub pixels of G at even-numbered locations as counted from above are controlled to be not allowed to emit color lights.

In FIG. 4, the sub pixel of R and the sub pixel of B in the first column are included in the pixel for right eye 121 in a vertical screen state. Therefore, in a vertical screen state, those sub pixels are controlled as pixels for right eye. Here, the case where the screen is turned left by 90 degrees will be considered (FIG. 6 is turned left by 90 degrees). In this case, the sub pixel of R is included in the pixel for right eye 121 as in the case of vertical screen state, but the sub pixel of B is included in the pixel for left eye. Therefore, the sub pixel of B is controlled as a pixel for left eye in a horizontal screen state (in the case where the screen is turned left by 90 degrees). In other words, color light emission control for the sub pixel of B in a horizontal screen state (in the case where the screen is turned left by 90 degrees) is the same as color light emission control for a sub pixel of B in the third column in a vertical screen state. On the other hand, the case where the screen is turned right by 90 degrees from a vertical screen state will be considered (FIG. 6 is turned right by 90 degrees). In this case, in contrast to the above case of left turn, the sub pixel of R is included in a pixel for left eye, and the sub pixel of B is still in a pixel for right eye. Therefore, in a horizontal screen state (in the case where the screen is turned right by 90 degrees), the sub pixel of R is controlled as a pixel for left eye. In other words, color light emission control for the sub pixel of R in a horizontal screen state (in the case where the screen is turned right by 90 degrees) is the same as color light emission control for a sub pixel of R in the third column in a vertical screen state.

That is, in the case where the screen is turned left by 90 degrees from a vertical screen state into a horizontal screen state, the sub pixel of B is switched between a role as a pixel for right eye and a role as a pixel for left eye, but the sub pixel of R is not changed in its role between before and after the turning. On the other hand, in the case where the screen is turned right by 90 degrees from a vertical screen state into a horizontal screen state, the sub pixel of R is switched between a role as a pixel for right eye and a role as a pixel for left eye, but the sub pixel of B is not changed in its role between before and after the turning.

As described above, the image control portion 50 performs control so that sub pixels in even-numbered columns or rows in the arrangement order starting from the sub pixel located at the upper left of the stereoscopic pixel 120 are selectively allowed or not allowed to emit color lights in accordance with whether in the horizontal display mode or in the vertical display mode. In the examples in FIG. 5 and FIG. 6, it can also be said that control is performed so that, in the vertical display mode, at least one of the sub pixels of G is not allowed to emit color light, and in the horizontal display mode, at least the other one of the sub pixels of G is not allowed to emit color light. In other words, the sub pixels of G that are allowed (not allowed) to emit color lights differ between the vertical display mode and the horizontal display mode. In addition, as a result of the arrangement as described above, while such control for selectively allowing or not allowing color light emission is performed, at least one sub pixel for each of R, and B is allowed to emit color light in both the vertical display mode and the horizontal display mode.

Figure 7:
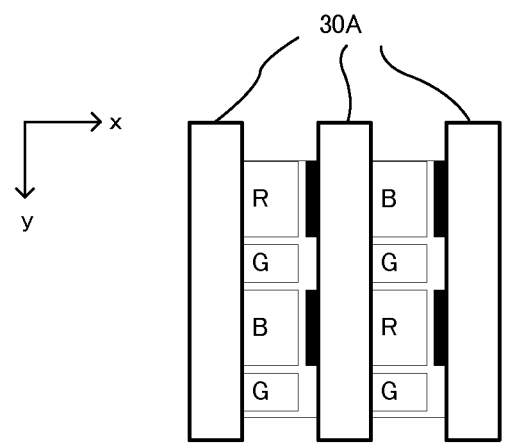
FIG. 7 is a non-limiting example diagram for explaining an effect of the exemplary embodiments.
Figure 8:
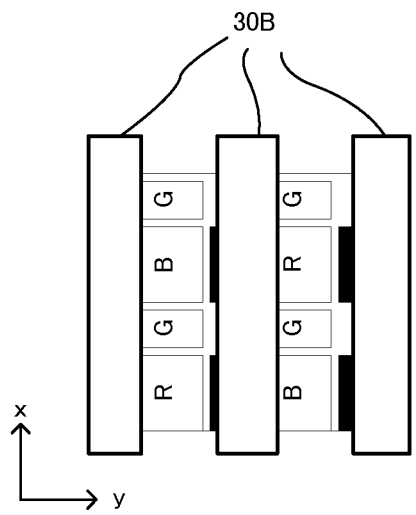
FIG. 8 is a non-limiting example diagram for explaining an effect of the exemplary embodiments.

Thus, in the arrangement pattern 1, the sub pixels included in the stereoscopic pixel 120 are arranged as shown in FIG. 4. As a result, in both cases where the screen is a "vertical screen" and where the screen is a "horizontal screen", the amounts of lights of R, G, and B entering both eyes of an observer increase or decrease in the same rate when the position of the observer's viewpoint is changed. For example, it will be assumed that the positions of both eyes of an observer slightly shift leftward from positions appropriate for recognizing stereoscopic display. In this case, in a "vertical screen" state, the parallax barrier 30A for vertical screen partially overlaps on left ends of sub pixels in the first and third columns as seen from an observer, as shown in FIG. 7. In a "horizontal screen" state, as shown in FIG. 8 (in FIG. 8, the screen is turned left by 90 degrees), the parallax barrier 30B for horizontal screen partially overlaps on left ends of sub pixels in the first and third columns along the x-axis direction in FIG. 8 (if the screen is taken as a vertical screen, the parallax barrier 30B for horizontal screen overlaps on upper ends in the first and third rows). In any case, R, G, and B decrease at an equal rate. In addition, for example, in FIG. 5, since areas in the second and fourth columns in which sub pixels of G are located are present, even if an observer is not at an ideal position for stereoscopic viewing, the observer can clearly view a stereoscopic image. That is, even if the position of an observer slightly shifts from such an ideal position, for example, when the observer's left eye views an image for left eye, light from an image for right eye is prevented from also entering the left eye. As a result, the observer does not view such an image corresponding to an adjacent pixel, and therefore, even in such a case, the observer can obtain a clear stereoscopic view. Further, providing sub pixels of G in such areas (for example, the second and fourth columns) for allowing clear stereoscopic viewing even if an observer is not at such an ideal position contributes to effective utilization of regions in the stereoscopic pixel 120.

Figure 9:
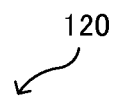
FIG. 9 is a diagram for explaining a concept in which color light emission control is performed on a region basis.

In the above description, the color light emission control is performed on a sub pixel basis, as an example. Hereinafter, the case where the above-described color light emission control is performed on a "region" basis and the arrangement pattern 1 is applied thereto will be described. FIG. 9 is a diagram showing a non-limiting example of a concept in which the color light emission control is performed on a region basis in the arrangement pattern 1. In FIG. 9, the stereoscopic pixel 120 is divided into 4×4 regions. The size ratio of the regions and the arrangement layout of the regions comply with the arrangement pattern 1. That is, a region A1 and a region C3 in FIG. 9 correspond to the sub pixels of R in FIG. 4, and a region A3 and a region C1 correspond to the sub pixels of B in FIG. 4. A region A2, a region A4, a region B1, a region B3, a region C2, a region C4, a region D1, and a region D3 correspond to the sub pixels of G in FIG. 4. A region B2, a region B4, a region D2, and a region D4 correspond to the vacant regions 126 in FIG. 4 (that is, there are no sub pixels located in those regions). The number of sub pixels located in each region is not limited to one, but a plurality of sub pixels may be included in each region. Colors of sub pixels located in the respective regions also comply with the arrangement pattern 1. For example, in each of the region A1 and the region C3, a plurality of sub pixels for only R are located. In the "horizontal display mode", control is performed so that the sub pixels located in the region B1, the region B3, the region D1, and the region D3 in FIG. 9 are not allowed to emit color lights. In the "vertical display mode", control is performed so that the sub pixels located in the region A2, the region C2, the region A4, and the region C4 are not allowed to emit color lights. Thus, also in the case of performing the color light emission control for sub pixels on a region basis, the same effect as described above can be obtained. In the above example, sub pixels included in each region have the same color (one color). However, in another embodiment, sub pixels included in each region may have two or more colors. That is, a certain region may include sub pixels having a plurality of colors.

In the arrangement pattern 1, the vertical side and the horizontal side of each sub pixel of R and B have the same length (that is, a square), and the vertical side and the horizontal side of each sub pixels of G have different lengths (have a long side and a short side). However, the lengths of these sides are not limited to the above example, but may be any lengths.

(Arrangement Pattern 2)

Figure 10:
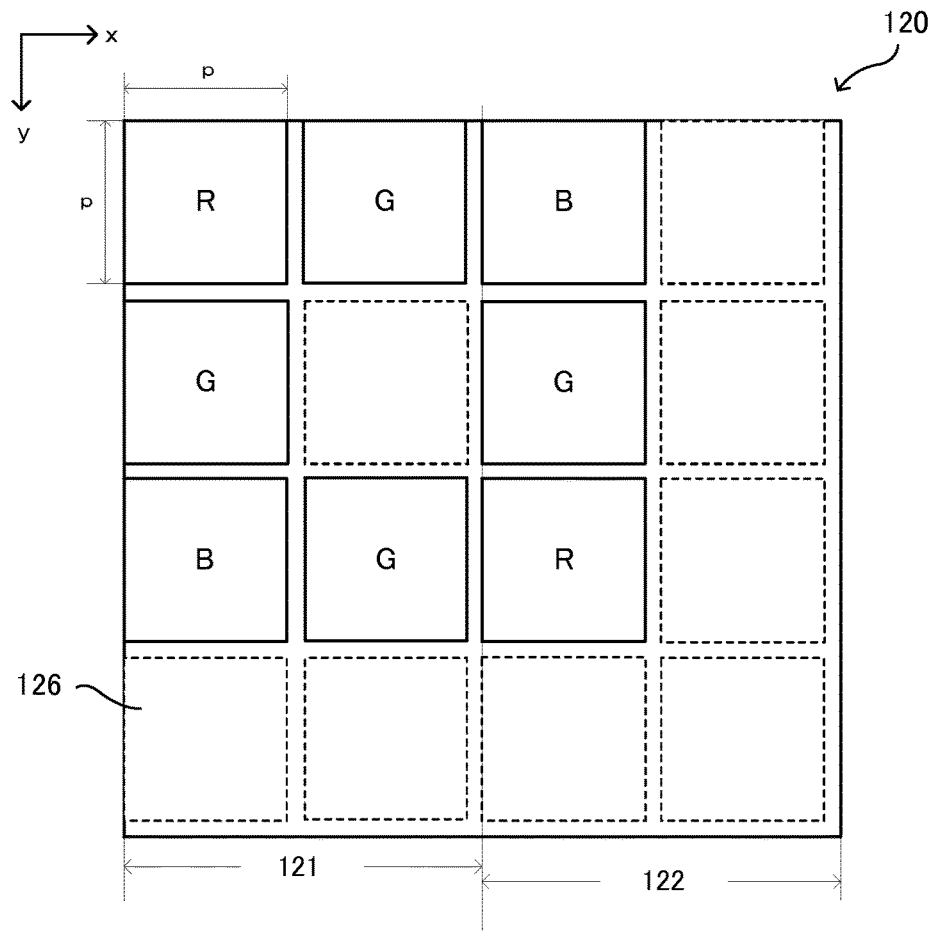
FIG. 10 is a diagram showing a non-limiting example of an arrangement pattern 2 of sub pixels in a stereoscopic pixel.

Next, another example of arrangement of sub pixels will be described with reference to FIG. 10. Hereinafter, an arrangement pattern shown in FIG. 10 is referred to as an "arrangement pattern 2". Also in FIG. 10, the case where the screen is a "vertical screen" is shown.

In the arrangement pattern in FIG. 10, the number of sub pixels included in the stereoscopic pixel 120 is eight in total. That is, a total number of sub pixels per one stereoscopic pixel is reduced as compared to the arrangement pattern 1. As for the breakdown, there are two sub pixels for each of R and B, and there are four sub pixels of G. In the stereoscopic pixel 120 as a whole, the number of sub pixels of G is more than the number of sub pixels of R or B.

In the pixel for right eye 121 in FIG. 10, in the left column (the first column in the stereoscopic pixel 120), one sub pixel for each color is located in order of R, G, then B in the vertical direction. A vacant region 126 is present under the sub pixel of B. In the right column (the second column in the stereoscopic pixel 120), one sub pixel of G is located at each position adjacent to the sub pixel of R or B. In addition, a vacant region 126 is also present at a position (a position not adjacent to the sub pixel of R or B) under each sub pixel of G.

On the other hand, in the pixel for left eye 122, in the left column (the third column in the stereoscopic pixel 120), one sub pixel for each color is located in order of B, G, then R in the vertical direction. This order is different (in this example, reverse order) from the order of sub pixels in the left column in the pixel for right eye 121. A vacant region 126 is present under the sub pixel of R. In addition, vacant regions 126 are present in the entire right column (the fourth column in the stereoscopic pixel 120).

Starting from the sub pixel located at the upper left (position at first column and first row) in the stereoscopic pixel 120, the sub pixels are arranged in order of R, G, then B (the same order) in the rightward direction and in the downward direction. That is, starting from the sub pixel located at the upper left in the stereoscopic pixel, the sub pixels of R, G, and B are arranged in the same order in the horizontal direction and in the vertical direction.

In the stereoscopic pixel 120 as a whole, it can also be said that eight sub pixels are arranged in an annular shape. The eight sub pixels arranged in this way are located on the upper left side in the stereoscopic pixel 120. In addition, as in the arrangement pattern 1, sub pixels positioned substantially line-symmetrically with respect to a diagonal line extending from the upper left to the lower right in the stereoscopic pixel 120 have the same color.

In the arrangement pattern 2, a vertical side and a horizontal side of each sub pixel located in the stereoscopic pixel 120 have the same length of p (i.e., a square), and the areas thereof are the same. In other words, in the arrangement pattern 2, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

Control for the stereoscopic pixel 120 using the arrangement pattern 2 is basically the same as in the arrangement pattern 1. That is, control is performed so that even-numbered sub pixels (in FIG. 10, sub pixels of G) in the arrangement order starting from the sub pixel located at the upper left of the stereoscopic pixel 120 are selectively allowed or not allowed to emit color lights in accordance with whether in the horizontal display mode or in the vertical display mode.

Figure 11:
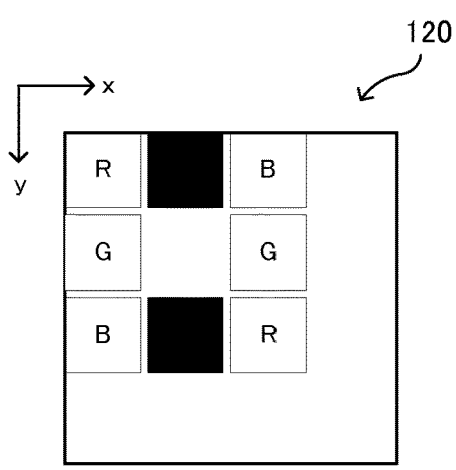
FIG. 11 is a schematic diagram showing a non-limiting example of control using the arrangement pattern 2 in the case of vertical screen.
Figure 12:
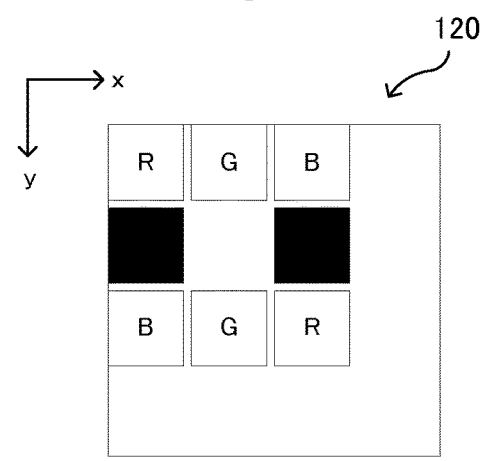
FIG. 12 is a schematic diagram showing a non-limiting example of control using the arrangement pattern 2 in the case of horizontal screen.

FIGS. 11 and 12 show a non-limiting example of the control for the stereoscopic pixel 120 in the case of the arrangement pattern 2. FIG. 11 shows a color light emission state of the stereoscopic pixel 120 in the "vertical display mode". FIG. 12 shows a color light emission state of the stereoscopic pixel 120 in the "horizontal display mode". In the "vertical display mode", control is performed so that, starting from the sub pixel located at the upper left in the stereoscopic pixel 120, sub pixels (sub pixels located in even-numbered columns) at even-numbered locations from left in the arrangement order are not allowed to emit color lights. In FIG. 11, sub pixels in the second column from left are not allowed to emit color lights. On the other hand, in the "horizontal display mode" shown in FIG. 12, control is performed so that, starting from the sub pixel located at the upper left in the stereoscopic pixel 120, sub pixels (sub pixels located in even-numbered rows) at even-numbered locations from above in the arrangement order are not allowed to emit color lights. In FIG. 12, sub pixels in the second row from above are not allowed to emit color lights. That is, as in the arrangement pattern 1, the image control portion 50 performs control so that even-numbered sub pixels in the arrangement order starting from the sub pixel located at the upper left of the stereoscopic pixel 120 are selectively allowed or not allowed to emit color lights in accordance with whether in the vertical display mode or in the horizontal display mode.

In the arrangement pattern 2, it can also be said that the length of each side (width) of sub pixels that are allowed to emit color lights and the length of each side (width) of sub pixels that are not allowed to emit color lights are the same.

Also in the case of performing the control using the arrangement pattern 2, the same effect as in the arrangement pattern 1 can be obtained.

In the arrangement pattern 2, in the stereoscopic pixel 120 as a whole, as shown in FIG. 10, a vacant region 126 is present at the center, and collection of eight sub pixels annularly located around the vacant region 126 is located to the upper left side of the stereoscopic pixel 120. In another embodiment, the collection of the sub pixels may be located to the upper right side of the stereoscopic pixel 120, or may be located to the lower left side or lower right side. In such a case, columns or rows targeted for the control for allowing or not allowing color light emission are changed. That is, columns or rows targeted for the control may be changed as appropriate so that similar control as shown in FIG. 11 and FIG. 12 is performed for the eight sub pixels that are annularly located.

(Arrangement Pattern 3)

Figure 13:
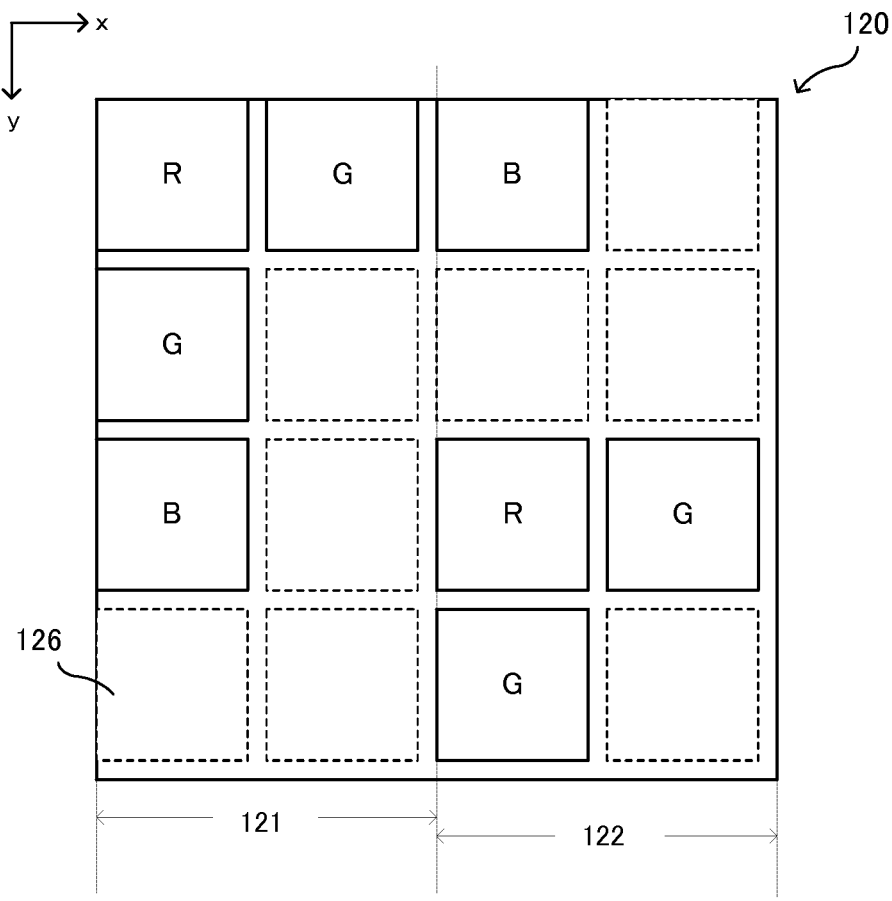
FIG. 13 is a diagram showing a non-limiting example of an arrangement pattern 3 of sub pixels in a stereoscopic pixel.

Next, still another example of arrangement of sub pixels will be described with reference to FIG. 13. Hereinafter, an arrangement pattern shown in FIG. 13 is referred to as an "arrangement pattern 3". Also in FIG. 13, the case where the screen is a "vertical screen" is shown.

In the arrangement pattern in FIG. 13, the number of sub pixels included in the stereoscopic pixel 120 is eight in total. Regarding the breakdown, there are two sub pixels for each of R and B, and there are four sub pixels of G. That is, as in the arrangement patterns 1 and 2, the number of sub pixels of G is more than the number of sub pixels of R or B.

In the pixel for right eye 121 in FIG. 13, in the left column, one sub pixel for each color is located in order of R, G, then B in the vertical direction. A vacant region 126 is present under the sub pixel of B. In the right column, one sub pixel of G is located at a position adjacent to the sub pixel of R. The entire region under the sub pixel of G is vacant regions 126.

On the other hand, in the pixel for left eye 122, in the left column, first, a sub pixel of B is located at the uppermost position. Under this, a sub pixel of R is located via a vacant region 126 corresponding to one sub pixel. Under this, a sub pixel of G is located. In the right column in the pixel for left eye 122, a sub pixel of G is located at a position adjacent to the sub pixel of R in the left column.

Figure 14:
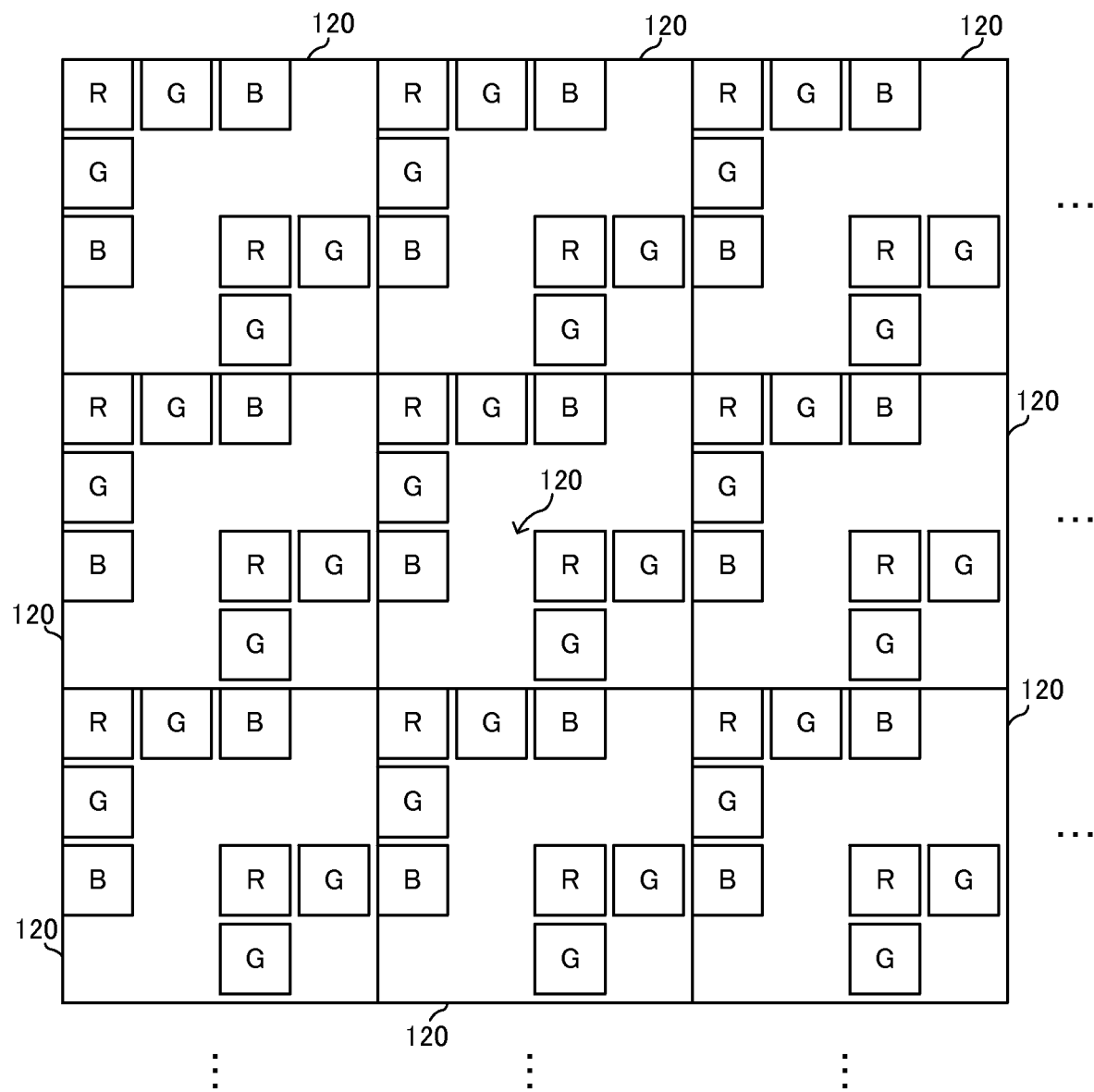
FIG. 14 is a schematic diagram showing a non-limiting example of a liquid crystal screen using the arrangement pattern 3.

In the stereoscopic pixel 120 as a whole in FIG. 13, a sub pixel of R is located at the upper left, and starting from this, sub pixels are arranged in the same order (R, G, then B) in the vertical direction (downward direction) and in the horizontal direction (rightward direction). This arrangement is also considered to be a reversed L shape. In addition, also at the lower right in the stereoscopic pixel 120, three sub pixels (one for R and two for G) are located in a reversed L shape. Although only one stereoscopic pixel 120 is shown in FIG. 13, in an actual liquid crystal screen, such stereoscopic pixels 120 are arranged in the vertical direction and in the horizontal direction. Therefore, when a plurality of stereoscopic pixels 120 are arranged (that is, in the entire screen), such sub pixel groups in reversed L shapes as described above are diagonally arranged, with vacant regions 126 present therebetween (see FIG. 14).

Also in the arrangement pattern 3, sub pixels positioned substantially line-symmetrically with respect to a diagonal line extending from the upper left to the lower right in the stereoscopic pixel 120 have the same color.

In the arrangement pattern 3, a vertical side and a horizontal side of each sub pixel located in the stereoscopic pixel have the same length, and the areas thereof are the same. In the arrangement pattern 3, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

Control for the stereoscopic pixel 120 using the arrangement pattern 3 is also basically the same as in the arrangement pattern 1. That is, control is performed so that even-numbered sub pixels (in FIG. 13, sub pixels of G) in the arrangement order starting from the sub pixel located at the upper left of the stereoscopic pixel 120 are selectively allowed or not allowed to emit color lights in accordance with whether in the vertical display mode or in the horizontal display mode.

Figure 15:
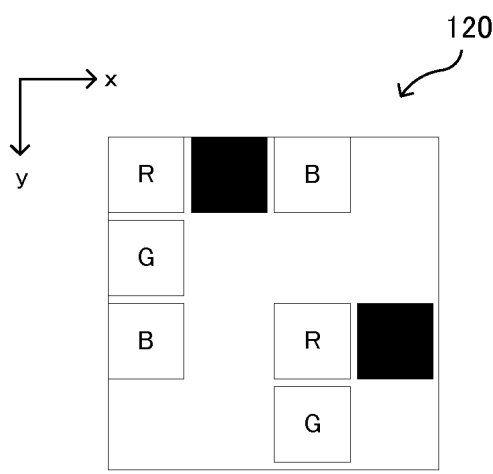
FIG. 15 is a schematic diagram showing a non-limiting example of control using the arrangement pattern 3 in the case of vertical screen.
Figure 16:
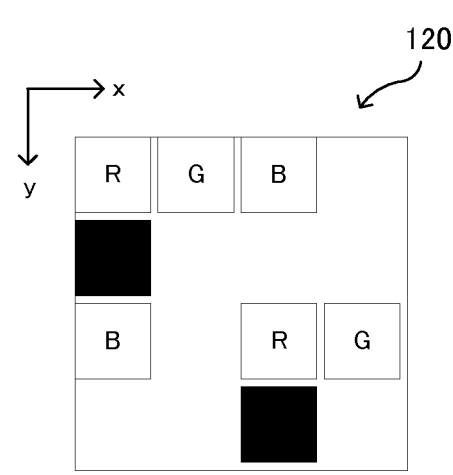
FIG. 16 is a schematic diagram showing a non-limiting example of control using the arrangement pattern 3 in the case of horizontal screen.

FIGS. 15 and 16 show a non-limiting example of the control for the stereoscopic pixel 120 in the case of the arrangement pattern 3. FIG. 15 shows a color light emission state of the stereoscopic pixel 120 in the "vertical display mode". FIG. 16 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in the example in FIG. 15, sub pixels of G in the second column and the fourth column from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in the example in FIG. 16, sub pixels of G in the second row and the fourth row from above are not allowed to emit color lights.

Also in the arrangement pattern 3, it can also be said that the length of each side (width) of sub pixels that are allowed to emit color lights and the length of each side (width) of sub pixels that are not allowed to emit color lights are the same.

Also in the case of performing the control using the arrangement pattern 3, the same effect as in the arrangement pattern 1 can be obtained. That is, in both cases of "vertical screen" and "horizontal screen", the amounts of lights of R, G, and B entering both eyes of an observer increase or decrease in the same rate when the position of the observer's viewpoint is changed.

(Arrangement Pattern 4)

Figure 17:
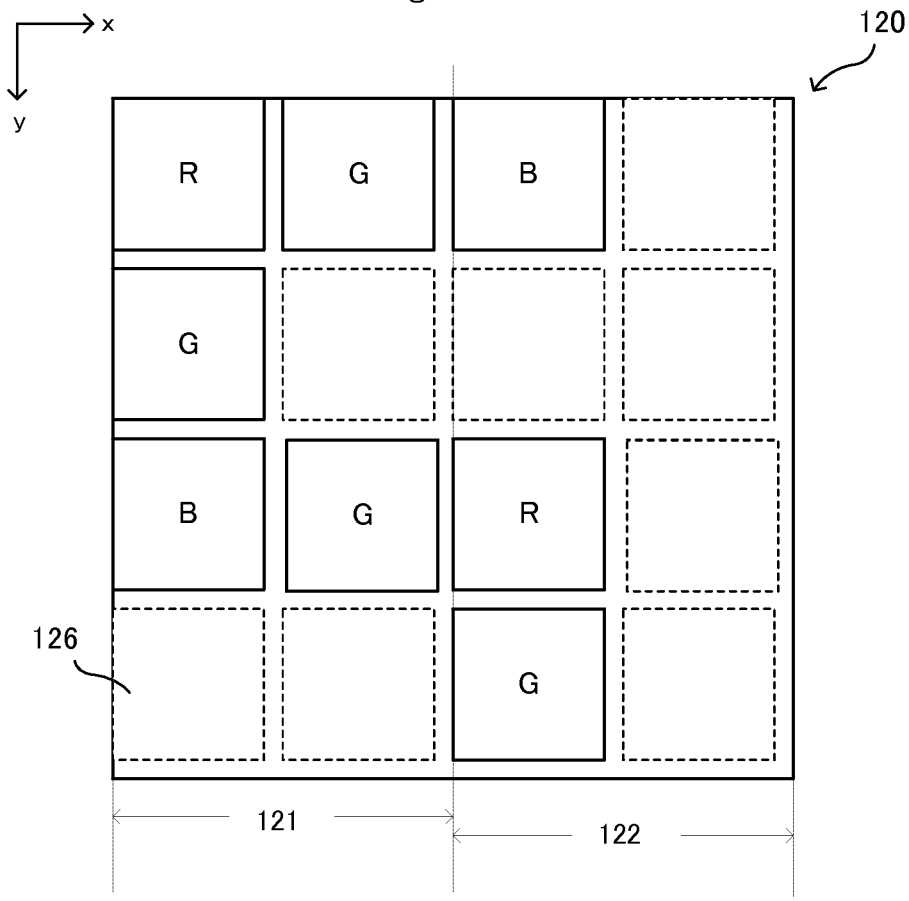
FIG. 17 is a diagram showing a non-limiting example of an arrangement pattern 4 of sub pixels in a stereoscopic pixel.

Next, still another example of arrangement of sub pixels will be described with reference to FIG. 17. Hereinafter, an arrangement pattern shown in FIG. 17 is referred to as an "arrangement pattern 4". Also in FIG. 17, the case where the screen is a "vertical screen" is shown.

In the arrangement pattern 4 in FIG. 17, the number of sub pixels included in the stereoscopic pixel 120 is eight in total. Regarding the breakdown, there are two sub pixels for each of R and B, and there are four sub pixels of G. As in the above arrangement patterns, the number of sub pixels of G is more than the number of sub pixels of R or B.

In the arrangement pattern 4 shown in FIG. 17, in the left column in the pixel for right eye 121, one sub pixel for each color is located in order of R, G, then B in the vertical direction. A vacant region 126 is present under the sub pixel of B. In the right column, one sub pixel of G is located at each position adjacent to the sub pixel of R or B. Vacant regions 126 are also present under the sub pixels of G.

On the other hand, in the pixel for left eye 122, in the left column, first, a sub pixel of B is located at the uppermost position. Under this, a sub pixel of R is located via a vacant region 126 corresponding to one sub pixel. Under this, a sub pixel of G is located. The entire right column in the pixel for left eye 122 is vacant regions 126.

In the stereoscopic pixel 120 as a whole, the arrangement order (in the horizontal direction) of sub pixels in the third row is a reverse order (different order) of the arrangement order of sub pixels in the first row.

Also in the arrangement pattern 4, a vertical side and a horizontal side of each sub pixel located in the stereoscopic pixel have the same length, and the areas thereof are the same. Therefore, also in the arrangement pattern 4, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

Control for the stereoscopic pixel 120 using the arrangement pattern 4 is also the same as in the above arrangement patterns. That is, control is performed so that even-numbered sub pixels (in FIG. 17, sub pixels of G) in the arrangement order starting from the sub pixel located at the upper left of the stereoscopic pixel 120 are selectively allowed or not allowed to emit color lights in accordance with whether in the vertical display mode or in the horizontal display mode.

Figure 18:
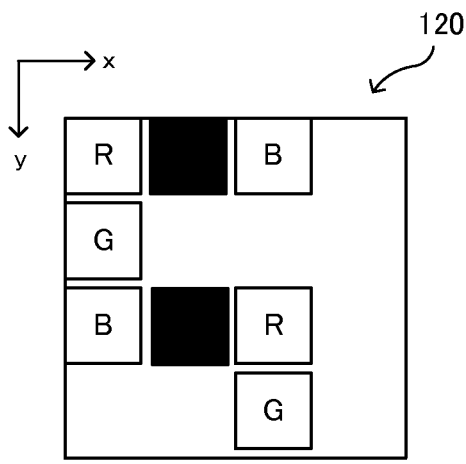
FIG. 18 is a schematic diagram showing a non-limiting example of control using the arrangement pattern 4 in the case of vertical screen.
Figure 19:
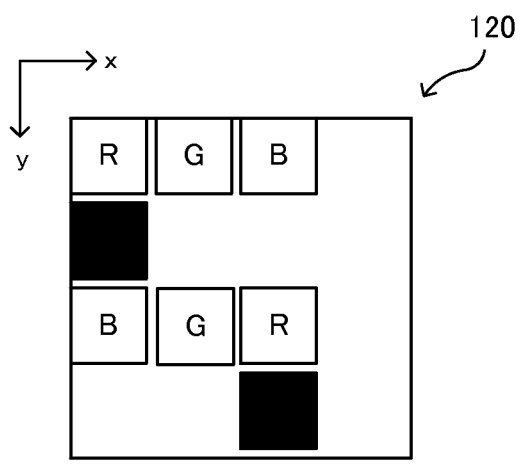
FIG. 19 is a schematic diagram showing a non-limiting example of control using the arrangement pattern 4 in the case of horizontal screen.

FIGS. 18 and 19 show a non-limiting example of the control for the stereoscopic pixel 120 in the case of the arrangement pattern 4. FIG. 18 shows a color light emission state of the stereoscopic pixel 120 in the "vertical display mode". FIG. 19 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in FIG. 18, the sub pixels of G in the second column from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in FIG. 19, sub pixels of G in the second row and the fourth row from above are not allowed to emit color lights.

Also in the arrangement pattern 4, the length of each side (width) of sub pixels that are allowed to emit color lights and the length of each side (width) of sub pixels that are not allowed to emit color lights are the same.

Also in the case of performing the control using the arrangement pattern 4, the same effect as in the arrangement patterns 1 to 3 can be obtained. That is, in both cases of "vertical screen" and "horizontal screen", the amounts of lights of R, G, and B entering both eyes of an observer increase or decrease in the same rate when the position of the observer's viewpoint is changed.

(Arrangement Pattern 5)

Figure 20:
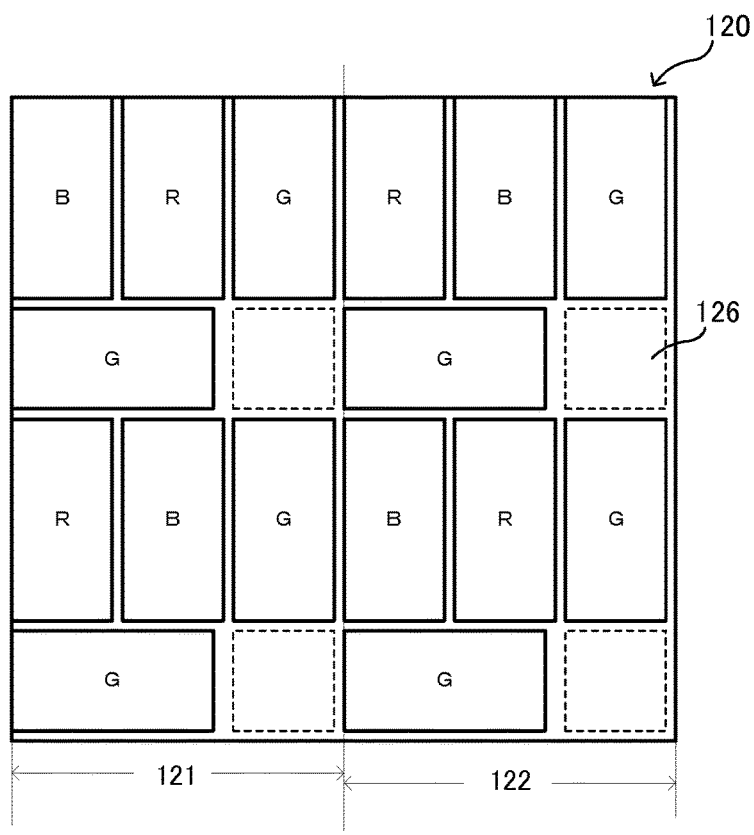
FIG. 20 is a diagram showing a non-limiting example of an arrangement pattern 5 of sub pixels in a stereoscopic pixel.

Next, still another example of arrangement of sub pixels will be described with reference to FIG. 20. Hereinafter, an arrangement pattern shown in FIG. 20 is referred to as an "arrangement pattern 5". Also in FIG. 20, the case where the screen is a "vertical screen" is shown.

In the arrangement pattern 5 in FIG. 20, the number of sub pixels included in the stereoscopic pixel 120 is sixteen in total. As for the breakdown, in both of the pixel for right eye 121 and the pixel for left eye 122, there are two sub pixels for each of R and B, and there are four sub pixels of G. As in the arrangement pattern 1 etc., in the stereoscopic pixel 120 as a whole, the number of sub pixels of G is more than the number of sub pixels of R or B.

In the arrangement pattern 5, there are six columns and four rows included in the stereoscopic pixel 120. In each of the pixel for right eye 121 and the pixel for left eye 122, there are three columns and four rows.

In the pixel for right eye 121 in FIG. 20, first, at the first column and the first row, a sub pixel of B is located. At the adjacent location on the right, i.e., at the second column and the first row, a sub pixel of R is located. Further, at the adjacent location on the right, i.e., at the third column and the first row, a sub pixel of G is located. Next, in the second row, a sub pixel of G is located across the first and second columns. At the adjacent location on the right, i.e., at the third column and the second row, a vacant region 126 is present. Next, in the third row, a sub pixel of R is located at the first column and the third row. At the adjacent location on the right, i.e., at the second column and the third row, a sub pixel of B is located. Further, at the adjacent location on the right, i.e., at the third column and the third row, a sub pixel of G is located. That is, as compared to the arrangement in the first row, the locations of R and B are reversed. Next, in the fourth row, as in the second row, a sub pixel of G is located across the first and second columns. At the adjacent location on the right, i.e., at the third column and the fourth row, a vacant region 126 is present.

Here, sizes, shapes, and arrangement orientations of sub pixels of R, B, and G will be described. As shown in FIG. 20, the sub pixels of R, B, and G have the same size, and the shapes thereof are rectangles. The length of a long side of these rectangles is twice as long as the length of a short side. In the first and third rows, the sub pixels are located with their long sides along the vertical direction. On the other hand, in the second and fourth rows, the sub pixels are located with their long sides along the horizontal direction.

Next, arrangement of sub pixels in the pixel for left eye 122 in FIG. 20 will be described. As shown in FIG. 20, the arrangement is basically similar to that in the pixel for right eye 121. However, the arrangements of sub pixels of R and B in the first and third rows are reversed from those in the pixel for right eye 121.

Next, control for the stereoscopic pixel 120 using the arrangement pattern 5 will be described. Also in this arrangement pattern, control for selectively allowing or not allowing sub pixels (of G) to emit color lights in accordance with whether in the horizontal display mode or in the vertical display mode. However, in this arrangement pattern, since the number of rows and the number of columns are different, the arrangement order of sub pixels that are control targets is different between in the column direction (vertical direction) and in the row direction (horizontal direction).

Figure 21:
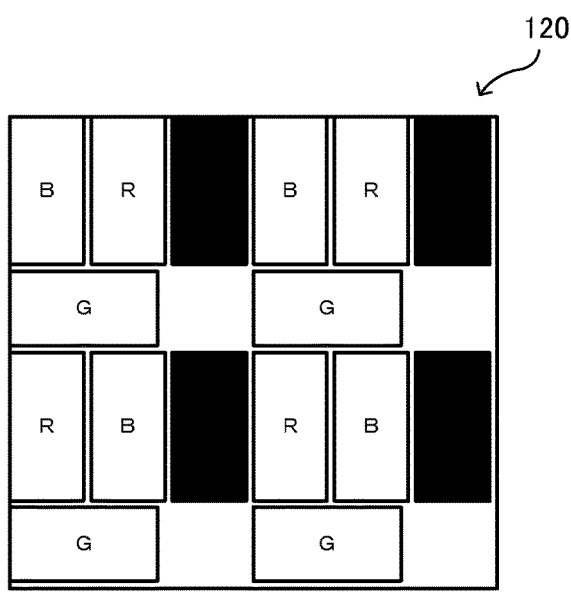
FIG. 21 is a schematic diagram showing a non-limiting example of control using the arrangement pattern 5 in the case of vertical screen.
Figure 22:
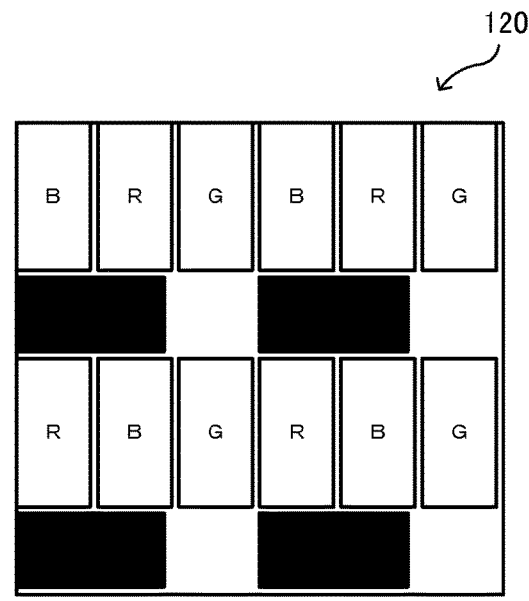
FIG. 22 is a schematic diagram showing a non-limiting example of control using the arrangement pattern 5 in the case of horizontal screen.

FIGS. 21 and 22 show a non-limiting example of the control for the stereoscopic pixel 120 in the case of the arrangement pattern 5. FIG. 21 shows a color light emission state of the stereoscopic pixel 120 in the "vertical display mode". FIG. 22 shows a color light emission state of the stereoscopic pixel 120 in the "horizontal display mode". In the "vertical display mode", control is performed so that, starting from the sub pixel located at the upper left in the stereoscopic pixel 120, sub pixels (of G) at the third and sixth locations from left in the arrangement order are not allowed to emit color lights. On the other hand, in the "horizontal display mode" shown in FIG. 22, control is performed so that, starting from the sub pixel located at the upper left in the stereoscopic pixel 120, sub pixels (of G) at the second and fourth locations from above in the arrangement order are not allowed to emit color lights. That is, in the "vertical display mode", sub pixels that are targets of the color light emission control are present at every third column, and in the "horizontal display mode", sub pixels that are targets of the color light emission control are present at every second row. Thus, the interval between sub pixels that are targets of the color light emission control is different between the vertical display mode and the horizontal display mode.

Also in the case of performing the control using the arrangement pattern 5, the same effect as in the arrangement pattern 1 can be obtained.

As described above, in the first embodiment, in the stereoscopic pixel 120, sub pixels for three primary colors of RGB are arranged in the above-described patterns, and the above-described color light emission control is performed. That is, sub pixels for one color of R, G, and B, the number of which is larger than the numbers of sub pixels for the other colors, are arranged at even-numbered locations in the arrangement order (specific examples of such arrangement patterns are as described above). Those sub pixels at the even-numbered locations are selectively subjected to the color light emission control. In the above examples, targets of such selective color light emission control are sub pixels of G, while sub pixels of R and B emit color lights in both cases of "vertical screen" and "horizontal screen". Thus, the amounts of lights of R, G, and B entering both eyes of an observer can be increased or decreased in the same rate in both cases of vertical screen and horizontal screen.

In each of the above arrangement patterns, it can also be said that a region having a predetermined width is provided between vertically arranged sub pixels for right eye and horizontally arranged sub pixels for left eye, and a sub pixel that is a target of control for allowing or not allowing color light emission is located in the region having the predetermined width. Thus, providing such a region having a predetermined width between sub pixels allows an observer to clearly view a stereoscopic image, and allows for effective utilization of such a region.

In another embodiment, the sub pixels that are arranged at even-numbered locations in the arrangement order and targeted for the selective color light emission control may be sub pixels of R or B. This means that sub pixels targeted for the selective color light emission control may be any one of R, G, and B. No matter what color is employed as the control target, the same effect as described above can be obtained.

In another embodiment, the arrangement order of sub pixels of RGB is not limited to the orders shown in the above arrangement patterns, but may be any order. For example, in the arrangement pattern 1, from the upper left of the stereoscopic pixel 120, sub pixels are arranged in order of R, G, B, then G in the vertical direction. However, instead of this order, for example, the sub pixels may be arranged in order of B, G, R, then G (in this case, an arrangement order in the third column is R, G, B, then G in the vertical direction). Further, in the arrangement pattern 1 again, the number of sub pixels is two for R, two for B, and eight for G. However, instead, the number of sub pixels may be eight for R, two for B, and two for G (namely, R and G may be replaced with each other in the arrangement pattern 1). That is, the arrangement order of sub pixels of RGB may be any order. In addition, a color of sub pixels for which control for allowing or not allowing color light emission may be any color.

Figure 23:
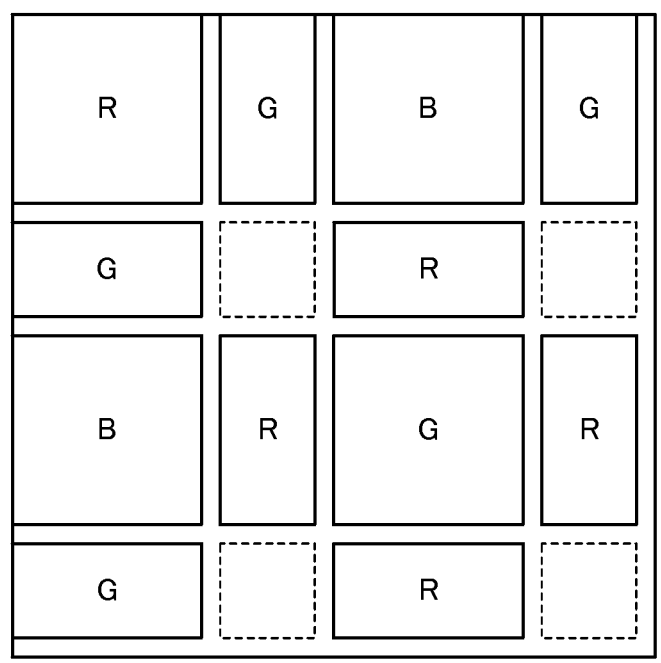
FIG. 23 is a diagram showing another non-limiting example of an arrangement patter.

In the above examples, sub pixels for only one color (in the above examples, sub pixels of G) are targeted for the selective color light emission control. In another embodiment, sub pixels for two colors may be targeted for the selective color light emission control. For example, an arrangement pattern as shown in FIG. 23 may be used. FIG. 23 shows an example in which sub pixels for two colors, i.e., sub pixels of R and G are targeted for the selective color light emission control, on the basis of the arrangement pattern 1. That is, in each of even-numbered columns and even-numbered rows, one sub pixel for each of R and G is located. As for odd-numbered columns or odd-numbered rows, for example, in the first column, sub pixels are arranged in order of R, G, B, then G as in the arrangement pattern 1. On the other hand, in the third column, unlike the arrangement pattern 1, sub pixels are arranged in order of B, R, G, then R. In other words, R and G are replaced with each other in the third column in the arrangement pattern 1. Even in the case of performing the above-described selective color light emission control using such an arrangement pattern, the same effect as described above can be obtained.

Second Embodiment

Next, the second embodiment will be described. In the first embodiment, the case of using sub pixels for three primary colors of RGB has been described as an example. In the second embodiment, the case where white (hereinafter, referred to as "W") is added thereto, i.e., the case of using sub pixels of RGBW will be described with several examples. In still another embodiment, an arrangement pattern described later in which yellow is used instead of white may be applied.

Configurations other than a configuration relevant to the sub pixels of W and the arrangement pattern of sub pixels in the stereoscopic pixel 120, i.e., the hardware configuration and the like of the display device 100 are basically the same as in the first embodiment. Therefore, mainly the arrangement pattern of sub pixels in the stereoscopic pixel 120 using RGBW will be described below.

(Arrangement Pattern 6)

Figure 24:
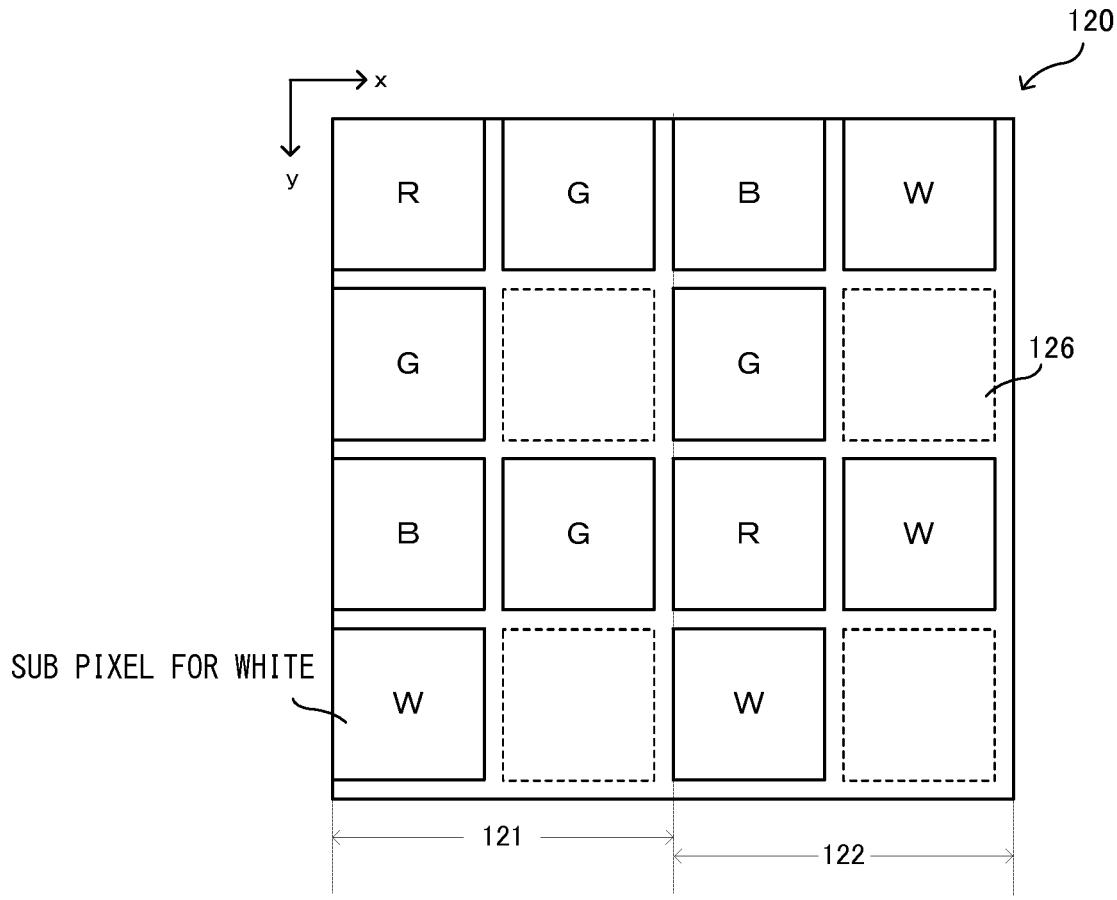
FIG. 24 is a diagram showing a non-limiting example of an arrangement pattern 6 of sub pixels in a stereoscopic pixel.

FIG. 24 is a diagram showing a non-limiting example of arrangement of sub pixels in the stereoscopic pixel 120 according to the second embodiment. Hereinafter, an arrangement pattern shown in FIG. 24 is referred to as an "arrangement pattern 6". In FIG. 24, the case where the screen is a "vertical screen" is shown.

The stereoscopic pixel 120 shown in FIG. 24 is composed of, as in the first embodiment, two pixels adjacent to each other in the horizontal direction, that is, a pixel for right eye 121 and a pixel for left eye 122.

In the arrangement pattern 6, there are six sub pixels included in each of the pixel for right eye 121 and the pixel for left eye 122, and the number of sub pixels included in the stereoscopic pixel 120 is twelve in total. This arrangement pattern is similar to the arrangement pattern 2 in the first embodiment, and corresponds to a pattern in which four sub pixels of W are located outside the annular pattern of sub pixels in the arrangement pattern 2. Specifically, sub pixels of W are additionally located in rows and columns where sub pixels of R and B are present in the arrangement pattern 2. That is, sub pixels of W are located at right ends in the first and third rows. In addition, sub pixels of W are also located at lower ends in the first and third columns. In other words, sub pixels of W are located at positions that are adjacent to a sub pixel of R or B and are not adjacent to a sub pixel of G.

Starting from the sub pixel located at the upper left in the stereoscopic pixel 120, sub pixels are arranged in order of R, G, B, then W (in the same order) in the rightward direction and in the downward direction.

In the stereoscopic pixel 120 as a whole, as in the arrangement pattern 2, sub pixels positioned substantially line-symmetrically with respect to a diagonal line extending from the upper left to the lower right in the stereoscopic pixel have the same color.

In addition, as in the arrangement pattern 2, sub pixels located substantially point-symmetric with respect to a specific position in the stereoscopic pixel have the same color.

In the arrangement pattern 6, a vertical side and a horizontal side of each sub pixel located in the stereoscopic pixel 120 have the same length, and the areas thereof are the same. Therefore, in the arrangement pattern 6, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

Control for the stereoscopic pixel 120 using the arrangement pattern 6 is basically the same as the control in the first embodiment.

Figure 25:
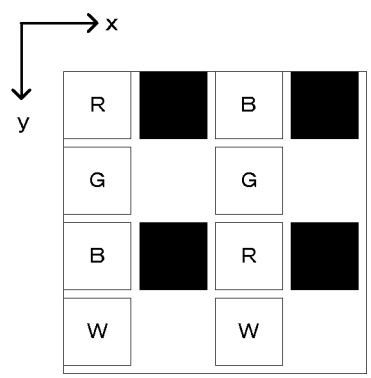
FIG. 25 is a schematic diagram showing a non-limiting example of control using the arrangement pattern 6 in the case of vertical screen.
Figure 26:
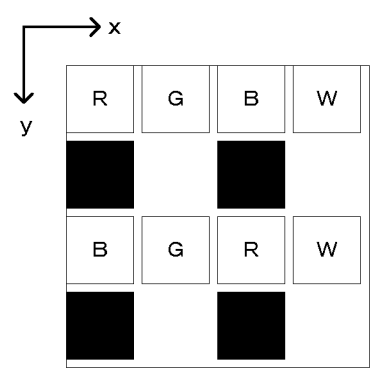
FIG. 26 is a schematic diagram showing a non-limiting example of control using the arrangement pattern 6 in the case of horizontal screen.

FIGS. 25 and 26 show a non-limiting example of the control for the stereoscopic pixel 120 in the case of the arrangement pattern 6. FIG. 25 shows a color light emission state of the stereoscopic pixel 120 in the "vertical display mode". FIG. 26 shows a color light emission state of the stereoscopic pixel 120 in the "horizontal display mode". In the "vertical display mode", control is performed so that, starting from the sub pixel located at the upper left in the stereoscopic pixel 120, sub pixels along the vertical direction at even-numbered locations from left in the arrangement order are not allowed to emit color lights. In the example in FIG. 25, control is performed so that sub pixels of G in the second column from left and sub pixels of W in the fourth column from left are not allowed to emit color lights. On the other hand, in the "horizontal display mode", control is performed so that, starting from the sub pixel located at the upper left in the stereoscopic pixel 120, sub pixels along the horizontal direction at even-numbered locations from above are not allowed to emit color lights. In the example in FIG. 26, control is performed so that sub pixels of G in the second row from above and sub pixels of W in the fourth row from above are not allowed to emit color lights. That is, as in the arrangement pattern 1 etc., the image control portion 50 performs control so that even-numbered sub pixels in the arrangement order starting from the sub pixel located at the upper left of the stereoscopic pixel 120 are selectively allowed or not allowed to emit color lights in accordance with whether in the horizontal display mode or in the vertical display mode.

In the arrangement pattern 6, the length of each side (width) of sub pixels that are allowed to emit color lights and the length of each side (width) of sub pixels that are not allowed to emit color lights are the same.

Also in the case of performing the control using the arrangement pattern 6, basically, the same effect as in the arrangement pattern 1 can be obtained. That is, in both cases of "vertical screen" and "horizontal screen", the amounts of lights of R, G, B, and W entering both eyes of an observer increase or decrease in the same rate when the position of the observer's viewpoint is changed.

(Arrangement Pattern 7)

Figure 27:
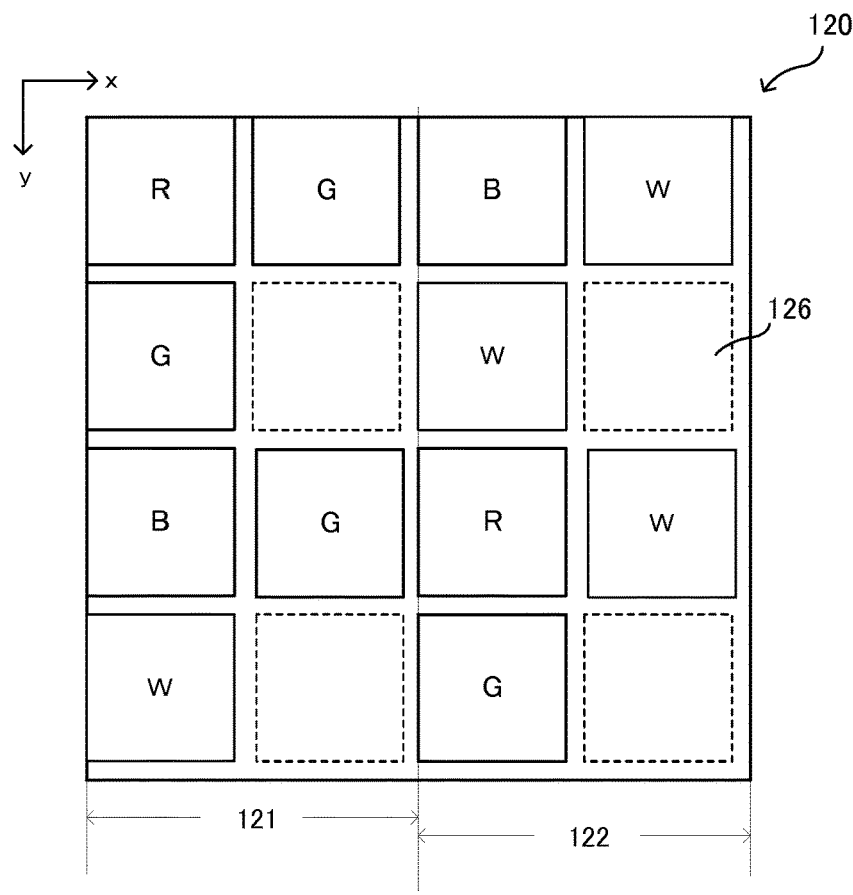
FIG. 27 is a diagram showing a non-limiting example of an arrangement pattern 7 of sub pixels in a stereoscopic pixel.

Next, still another example of arrangement of sub pixels will be described with reference to FIG. 27. Hereinafter, an arrangement pattern shown in FIG. 27 is referred to as an "arrangement pattern 7". Also in FIG. 27, the case where the screen is a "vertical screen" is shown.

The arrangement pattern 7 shown in FIG. 27 is obtained by adding four sub pixels of W in the arrangement pattern 4 of the first embodiment. Specifically, the arrangement pattern 7 is obtained by locating sub pixels of W under a sub pixel of B in the first column, at the second row in the third column, and at the first and third rows in the fourth column in the arrangement pattern 4 (all the sub pixels of W are adjacent to a sub pixel of R or B). The sizes of sub pixels are the same. Therefore, also in the arrangement pattern 7, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

In the arrangement pattern 7, starting from the upper left (at the first column and the first row) in the stereoscopic pixel 120, sub pixels are arranged in order of R, G, B, then W (in the same order) in the rightward direction and in the downward direction.

Figure 28:
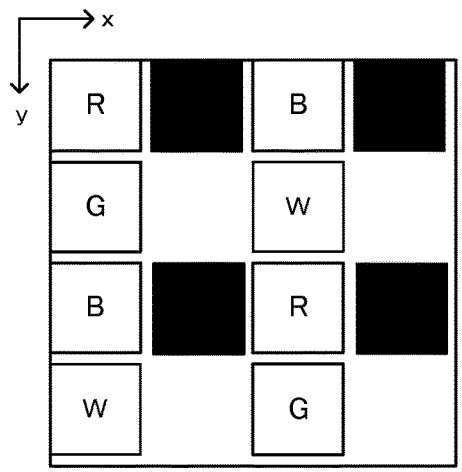
FIG. 28 is a schematic diagram showing a non-limiting example of control using the arrangement pattern 7 in the case of vertical screen.
Figure 29:
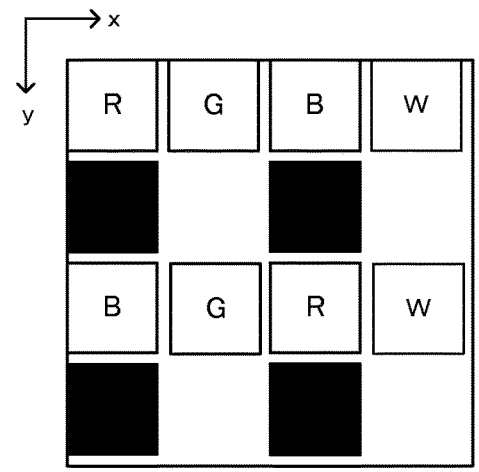
FIG. 29 is a schematic diagram showing a non-limiting example of control using the arrangement pattern 7 in the case of horizontal screen.

Control for the stereoscopic pixel 120 using the arrangement pattern 7 and the obtained effect are the same as in the arrangement pattern 5. FIGS. 28 and 29 show a non-limiting example of the control for the stereoscopic pixel 120 in the case of the arrangement pattern 7. FIG. 28 shows a color light emission state of the stereoscopic pixel 120 in the "vertical display mode". FIG. 29 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in the example in FIG. 28, sub pixels of G in the second column from left and sub pixels of W in the fourth column from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in the example in FIG. 29, sub pixels of G and W in the second and fourth rows from above are not allowed to emit color lights.

(Arrangement Pattern 8)

Figure 30:
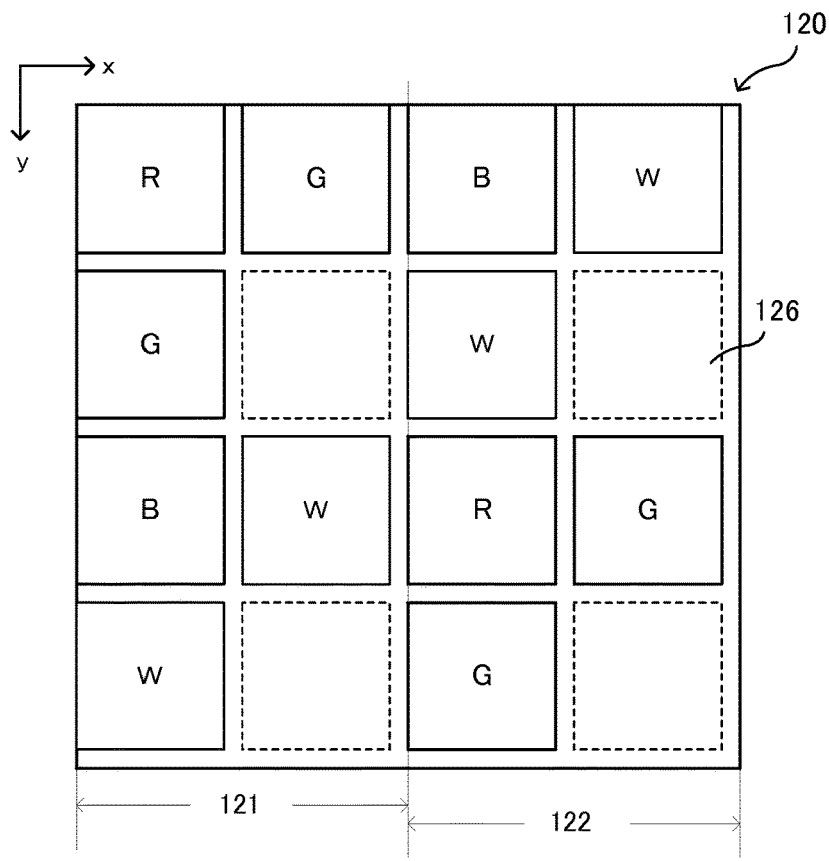
FIG. 30 is a diagram showing a non-limiting example of an arrangement pattern 8 of sub pixels in a stereoscopic pixel.

Next, still another example of arrangement of sub pixels will be described with reference to FIG. 30. Hereinafter, an arrangement pattern shown in FIG. 30 is referred to as an "arrangement pattern 8". Also in FIG. 30, the case where the screen is a "vertical screen" is shown.

The arrangement pattern 8 shown in FIG. 30 is obtained by adding four sub pixels of W in the arrangement pattern 3. Specifically, the arrangement pattern 8 is obtained by locating sub pixels of W at four vacant regions 126 present on a diagonal line extending from the upper right to the lower left in the arrangement pattern 3. The sizes of sub pixels are the same. Therefore, also in the arrangement pattern 8, in both a vertical screen state and a horizontal screen state, the widths of the sub pixels in the horizontal direction as seen from an observer are such that the ratio of the horizontal width of each sub pixel of R and B and the horizontal width of the sub pixel of G is 1:1.

Starting from the sub pixel located at the upper left of the stereoscopic pixel 120, sub pixels are arranged in order of R, G, B, then W in the rightward direction and in the downward direction.

Figure 31:
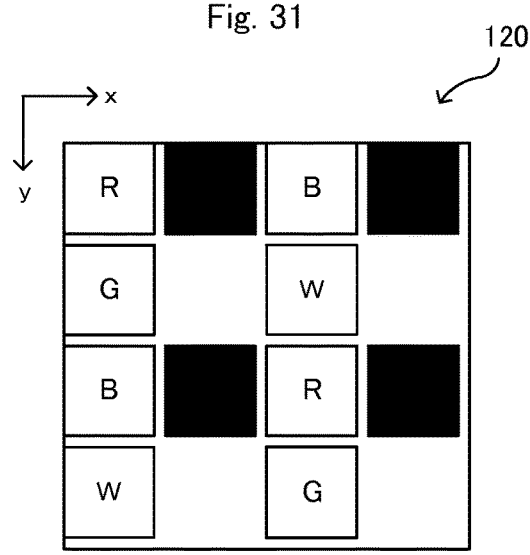
FIG. 31 is a schematic diagram showing a non-limiting example of control using the arrangement pattern 8 in the case of vertical screen.
Figure 32:
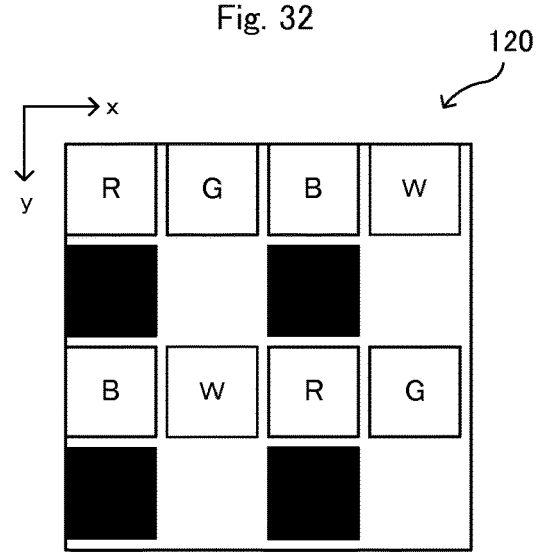
FIG. 32 is a schematic diagram showing a non-limiting example of control using the arrangement pattern 8 in the case of horizontal screen.

Control for the stereoscopic pixel 120 using the arrangement pattern 8 and the obtained effect are also the same as in the arrangement pattern 5. FIGS. 31 and 32 show a non-limiting example of the control for the stereoscopic pixel 120 in the case of the arrangement pattern 8. FIG. 31 shows a color light emission state of the stereoscopic pixel 120 in the "vertical display mode". FIG. 32 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in the example in FIG. 31, sub pixels of G and W in the second and fourth columns from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in the example in FIG. 32, sub pixels of G and W in the second and fourth rows from above are not allowed to emit color lights.

(Arrangement Pattern 9)

Figure 33:
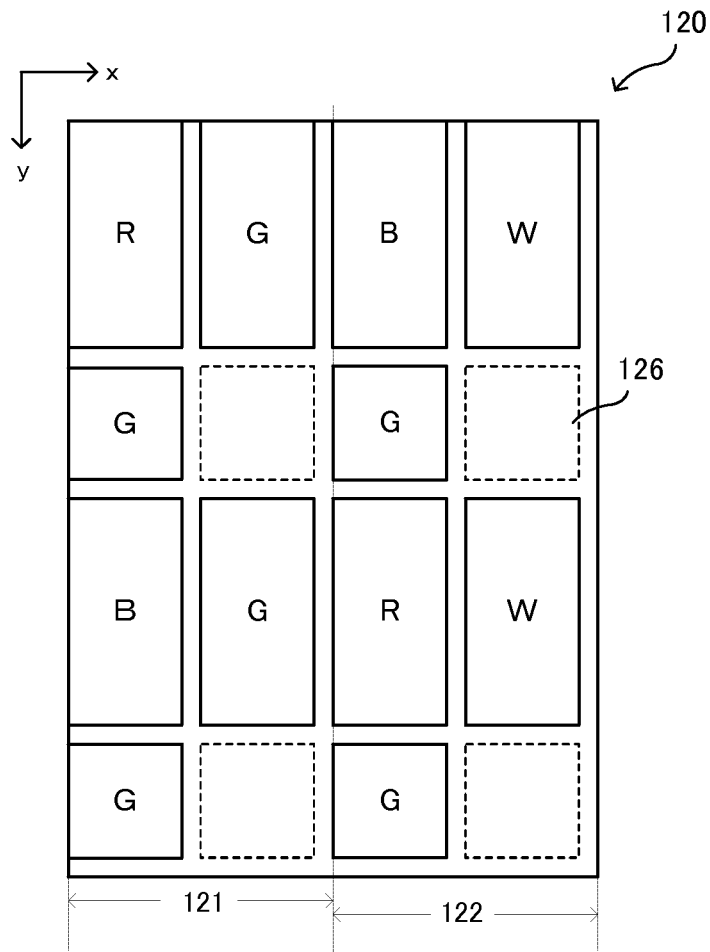
FIG. 33 is a diagram showing a non-limiting example of an arrangement pattern 9 of sub pixels in a stereoscopic pixel.

Next, still another example of arrangement of sub pixels will be described with reference to FIG. 33. Hereinafter, an arrangement pattern shown in FIG. 33 is referred to as an "arrangement pattern 9". Also in FIG. 33, the case where the screen is a "vertical screen" is shown.

The arrangement pattern 9 shown in FIG. 33 is similar to the arrangement pattern 5 of the first embodiment. Specifically, the arrangement pattern 9 is obtained by adding two sub pixels of W in the arrangement pattern 5. The size of the sub pixels of W is the same as those of the sub pixels of R and B. The sub pixels of W are located, adjacent to sub pixels of R or B, in the fourth column in the arrangement pattern 5.

Next, control for the stereoscopic pixel 120 using the arrangement pattern 9 will be described. Basically, as in the arrangement patterns described above, control is performed so that even-numbered sub pixels (in FIG. 33, sub pixels of G) in the arrangement order starting from the sub pixel located at the upper left of the stereoscopic pixel 120 are selectively allowed or not allowed to emit color lights in accordance with whether in the "vertical display mode" or in the "horizontal display mode".

Figure 34:
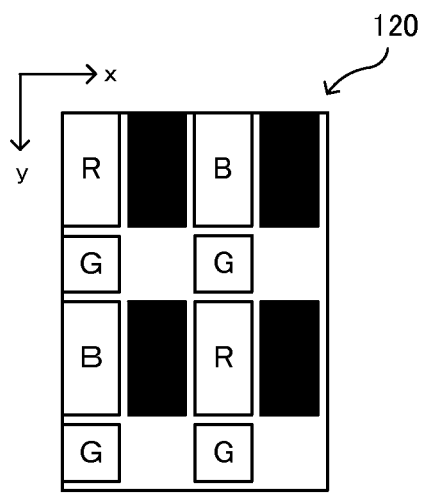
FIG. 34 is a schematic diagram showing a non-limiting example of control using the arrangement pattern 9 in the case of vertical screen.
Figure 35:
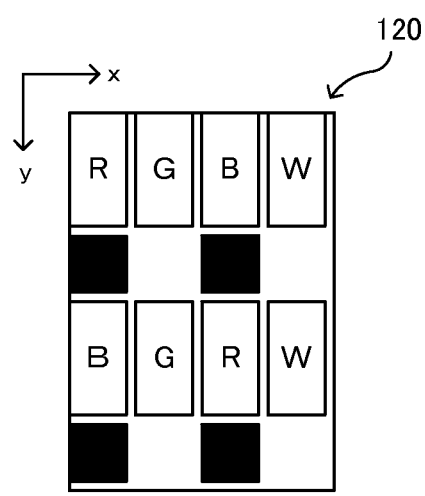
FIG. 35 is a schematic diagram showing a non-limiting example of control using the arrangement pattern 9 in the case of horizontal screen.

FIGS. 34 and 35 show a non-limiting example of the control for the stereoscopic pixel 120 in the case of the arrangement pattern 9. FIG. 34 shows a color light emission state of the stereoscopic pixel 120 in the "vertical display mode". FIG. 35 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in the example in FIG. 34, sub pixels of G in the second column from left and sub pixels of W in the fourth column from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in the example in FIG. 35, sub pixels of G in the second row and the fourth row from above are not allowed to emit color lights. In the arrangement pattern 9, the sub pixels of W are controlled so as to emit color lights in a "horizontal screen" state and so as not to emit color lights in a "vertical screen" state, unlike the arrangement patterns 6 to 8. However, as for the sub pixels of R, G, and B, the same effect as in the above arrangement patterns can be obtained. In another embodiment, considering that the sub pixels of W are controlled to be allowed or not allowed to emit color lights depending on whether in a vertical screen state or in a horizontal screen state, the following control may be performed. That is, a correspondence relationship between RGB and RGBW may be set in advance, and color light emission of RGBW may be controlled in accordance with the correspondence relationship. For example, a correspondence relationship of values of R, G, B, and W between the case where white is expressed by only RGB and the case where white is expressed by RGBW may be set in advance, and control based on the correspondence relationship may be performed.

(Arrangement Pattern 10)

Figure 36:
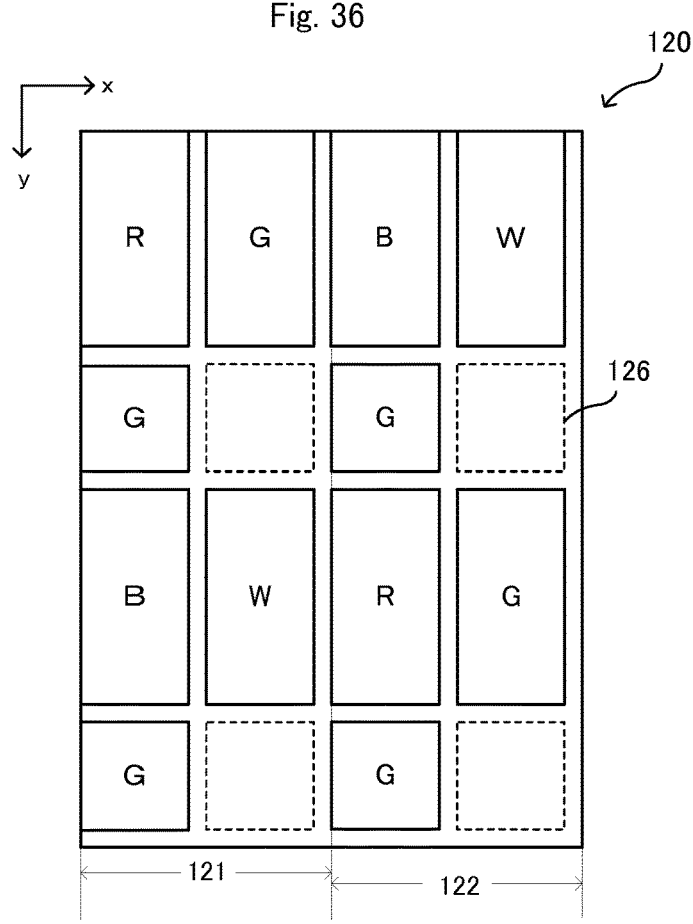
FIG. 36 is a diagram showing a non-limiting example of an arrangement pattern 10 of sub pixels in a stereoscopic pixel.

Next, still another example of arrangement of sub pixels will be described with reference to FIG. 36. Hereinafter, an arrangement pattern shown in FIG. 36 is referred to as an "arrangement pattern 10". Also in FIG. 36, the case where the screen is a "vertical screen" is shown.

The arrangement pattern 10 shown in FIG. 36 is similar to the arrangement pattern 9. Specifically, the arrangement pattern 10 is obtained by reversing the positions of sub pixels of G and W in the third row in the arrangement pattern 9. The other part is the same as in the arrangement pattern 9.

Control for the stereoscopic pixel 120 using the arrangement pattern 10 is also the same as in the arrangement pattern 9. That is, control is performed so that even-numbered sub pixels (in FIG. 36, sub pixels of G) in the arrangement order starting from the sub pixel located at the upper left of the stereoscopic pixel 120 are selectively allowed or not allowed to emit color lights in accordance with whether in the vertical display mode or in the horizontal display mode.

Figure 37:
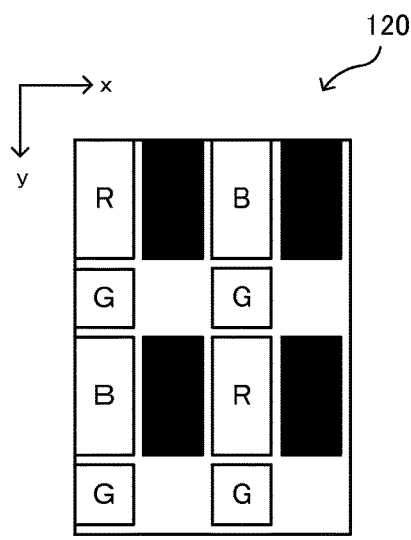
FIG. 37 is a schematic diagram showing a non-limiting example of control using the arrangement pattern 10 in the case of vertical screen.
Figure 38:
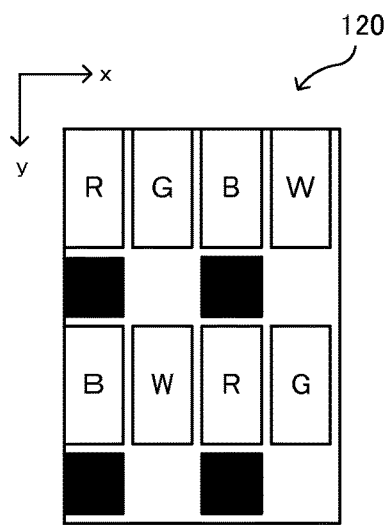
FIG. 38 is a schematic diagram showing a non-limiting example of control using the arrangement pattern 10 in the case of horizontal screen.

FIGS. 37 and 38 show a non-limiting example of the control for the stereoscopic pixel 120 in the case of the arrangement pattern 10. FIG. 37 shows a color light emission state of the stereoscopic pixel 120 in the "vertical display mode". FIG. 38 shows a color light emission state of the stereoscopic pixel 120 in the "horizontal display mode". In the "vertical display mode", control is performed so that, starting from the sub pixel located at the upper left in the stereoscopic pixel 120, even-numbered sub pixels in the horizontal direction, i.e., in the example in FIG. 37, sub pixels of G and W in the second and fourth columns from left are not allowed to emit color lights. On the other hand, in the "horizontal display mode", control is performed so that, starting from the sub pixel located at the upper left in the stereoscopic pixel 120, even-numbered sub pixels in the vertical direction in the arrangement order, i.e., in the example in FIG. 38, sub pixels of G in the second row and the fourth row from above are not allowed to emit color lights. Thus, the sub pixels of W are controlled so as to emit color lights in a "horizontal screen" state and so as not to emit color lights in a "vertical screen" state, as in the arrangement pattern 9. As for the sub pixels of R, G, and B, the same effect as in the above arrangement patterns can be obtained.

As described above, in the second embodiment, the stereoscopic pixel 120 is configured using sub pixels of W in addition to RGB. Thus, even if the positions of both eyes of an observer are shifted rightward or leftward to some extent from appropriate positions for recognizing stereoscopic display, the amounts of lights of R, G, and B entering both eyes of the observer increase or decrease in the same rate. In the arrangement patterns 6 to 10, the same effect can be obtained also for sub pixels of W.

Figure 39:
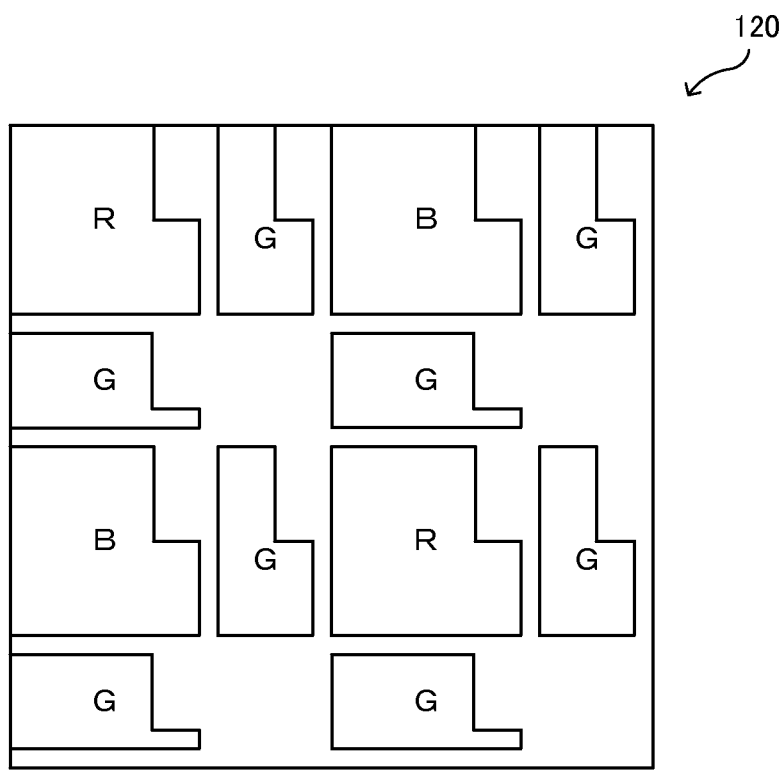
FIG. 39 is a diagram showing a non-limiting example of shapes of sub pixels.

In the above arrangement patterns, the case where the shapes of sub pixels are a square or a rectangle (quadrangle) has been shown as an example. However, the shapes of sub pixels are not limited thereto, but may be a circle or an oval. Further, other polygonal shapes may be employed. FIG. 39 shows a non-limiting example of different shapes of sub pixels in the arrangement pattern 1. Also in the case of using such shapes, the same effect as described above can be obtained.

Also the areas (sizes) of sub pixels are not limited to the above examples, but may be changed. Any sizes of sub pixels may be employed as long as the arrangement patterns as described above can be applied.

Figure 40:
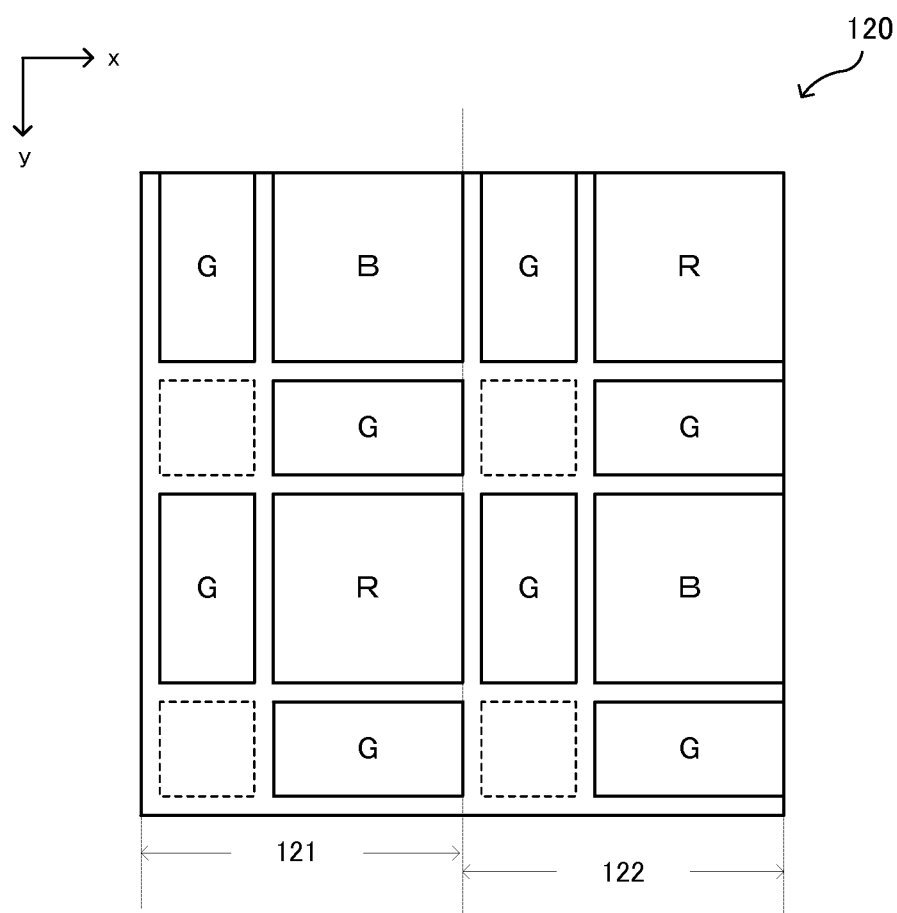
FIG. 40 is a diagram showing a non-limiting example of a pattern obtained by inverting the arrangement pattern 1 in the horizontal direction.

In the arrangement pattern 1, odd-numbered columns and rows as counted from the upper left include sub pixels of R, G, and B, and even-numbered columns include only sub pixels of G. In another embodiment, this pattern may be inverted in the horizontal direction. FIG. 40 shows a non-limiting example of an arrangement pattern obtained by inverting the arrangement pattern 1 in the horizontal direction. In this pattern, sub pixels are arranged line-symmetrically with respect to a diagonal line extending from the upper right to the lower left. In this case, regarding the control for the stereoscopic pixel, sub pixels located in odd-numbered rows and columns starting from the upper left are targeted for the control for allowing or not allowing color light emission. Alternatively, an arrangement pattern obtained by inverting the arrangement pattern 1 in the vertical direction may be used. That is, the first to fourth rows in the arrangement pattern 1 may be arranged in a reverse order from above. Further, an arrangement pattern obtained by inverting the arrangement pattern 1 in the vertical direction and in the horizontal direction may be used.

Figure 41:
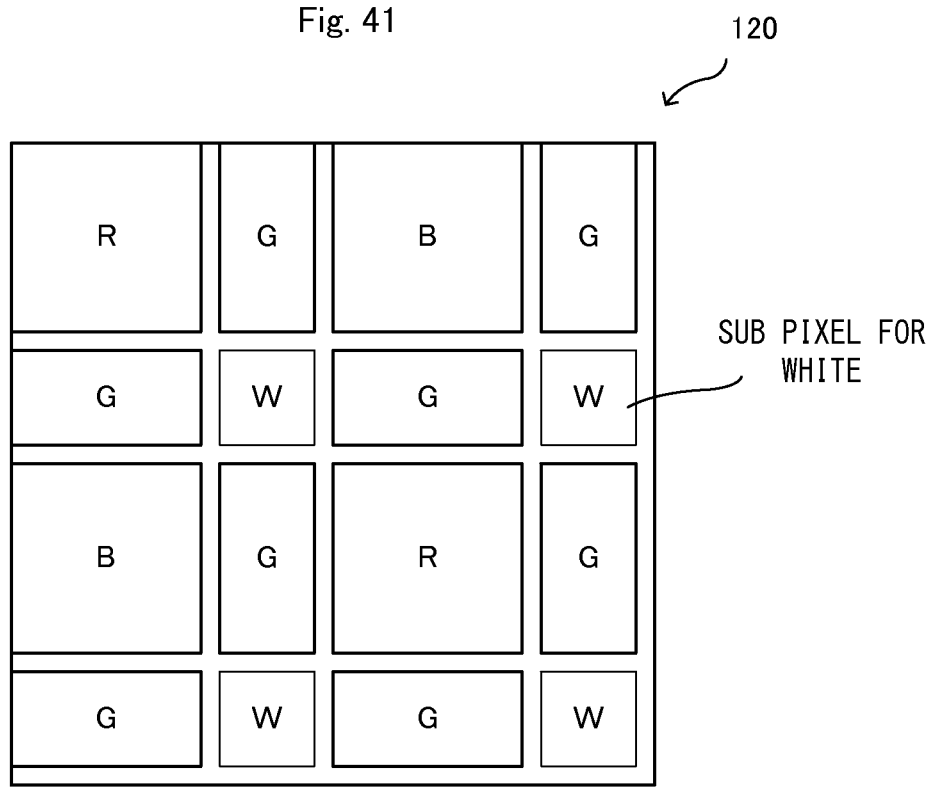
FIG. 41 is a diagram showing another non-limiting example of an arrangement patter.

The display device 100 may be configured to display not only a stereoscopic image but also a 2-dimensional image. For example, the liquid crystal display may be configured to selectively form the state in which a plurality of parallax images according to the number of viewpoints for stereoscopic viewing are displayed, or the state in which one 2-dimensional image is displayed as a whole. In addition, the liquid crystal display may be configured to allow an observer to switch display of a stereoscopic image and display of a 2-dimensional image. In such a case, the sub pixels arranged in the above arrangement patterns are also used for displaying a 2-dimensional image. For this operation, the following configuration may be employed. For example, at a vacant region 126 in the arrangement pattern 1, a sub pixel used only for displaying a 2-dimensional image may be located. FIG. 41 shows an example of such an arrangement pattern. The example in FIG. 41 is a pattern in which sub pixels for white are located at vacant regions 126 in the arrange pattern 1. In such an arrangement pattern, for the sub pixels for white, control may be performed so that this sub pixel is not used for stereoscopic display but is used only for displaying a 2-dimensional image. As a result, in the case of displaying a 2-dimensional image, brightness of the screen can be increased or power consumption by the backlight can be reduced.

In the above embodiments, the case where sub pixels for three or more colors are included in the stereoscopic pixel 120 has been shown as an example. In another embodiment, the number of colors of sub pixels included in the stereoscopic pixel 120 may be two. Also in this case, the amounts of color lights entering both eyes of an observe increase or decrease in the same rate.

Figure 42:
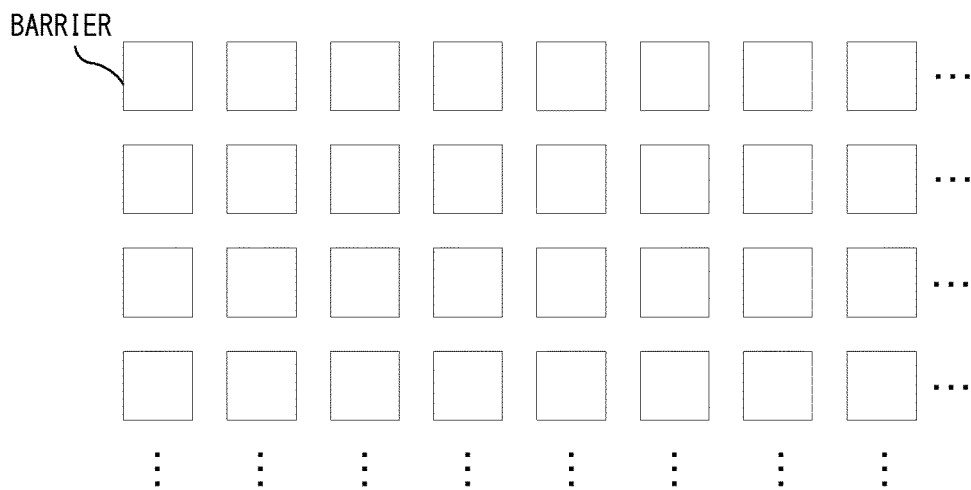
FIG. 42 is a diagram showing a non-limiting example of the configuration of a parallax barrier.
Figure 43:
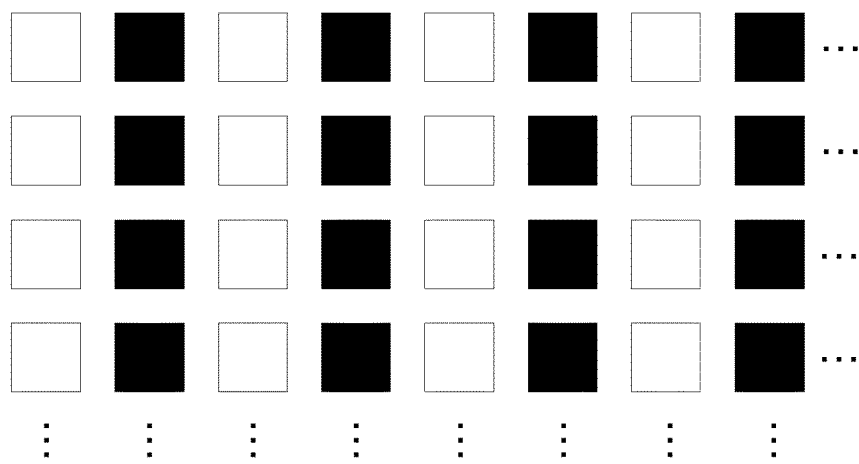
FIG. 43 is a diagram showing a non-limiting example of control for the parallax barrier.
Figure 44:
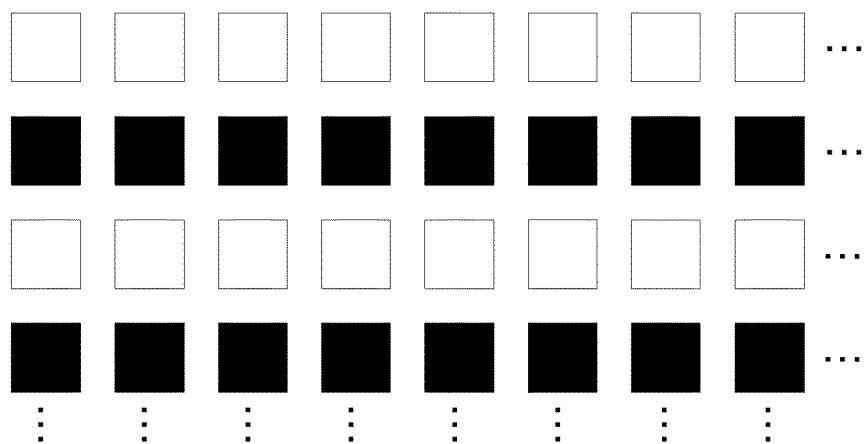
FIG. 44 is a diagram showing a non-limiting example of control for the parallax barrier.

In the above embodiments, the case of using two barriers of the parallax barrier 30A for vertical screen and the parallax barrier 30B for horizontal screen has been shown as an example. In another embodiment, such a configuration may be realized by a single barrier. For example, as shown in FIG. 42, a single parallax barrier (as a whole) in which quadrangle barriers are arranged in a matrix form may be used. Each barrier arranged in a matrix form may be individually controlled to turn on or off in accordance with whether in a vertical screen state or a horizontal screen state. FIG. 43 shows a non-limiting example of control for such a barrier in a vertical screen state. FIG. 44 shows a non-limiting example of control for such a barrier in a horizontal screen state. In FIG. 43, barriers in the second, fourth, sixth, and eighth columns are turned on. In FIG. 44, barriers in the second and fourth rows are turned on. Through such control, both functions of parallax barriers for vertical screen and horizontal screen may be realized by a single parallax barrier.

What is claimed is:

1. A display device for displaying a stereoscopic image comprising an image for a right eye and an image for a left eye, the display device comprising:
   an image display having a plurality of stereoscopic pixels each comprising a pixel for a right eye and a pixel for a left eye, the plurality of stereoscopic pixels being arranged in a first direction and in a second direction different from the first direction;
   a display mode selector configured to set one of at least a first direction display mode and a second direction display mode;
   a parallax barrier layer configured to form a parallax barrier in accordance with the setting by the display mode selector; and
   an image controller configured to control the image display in accordance with the setting by the display mode selector, the pixel for the right eye and the pixel for the left eye each including at least one sub pixel for each of red, blue, and green, and at least one vacant region in which no sub pixel is located, two sub pixels for a same color being located, in each pixel, so as to be adjacent to the at least one vacant region in the first direction and the second direction, and for each pixel of the pixels for the right eye and the pixels for the left eye, the image controller operating as follows:
   when the first direction display mode is set, switch sub pixels in a column including the vacant region to not generate light, and switch all of sub pixels for colors other than a color of the sub pixels which are switched to not generate light to generate light, among sub pixels of each of the pixel for the right eye and the pixel for the left eye, and
   when the second direction display mode is set, switch sub pixels in a row including the vacant region to not generate light, and switch all of sub pixels for colors other than a color of the sub pixels which are switched to not generate light, to generate light, among sub pixels of each of the pixel for the right eye and the pixel for the left eye.

2. The display device according to claim 1, wherein, in each of the pixels for the right eye and the pixels for the left eye, the number of sub pixels for a color which is adjacent to the vacant region in the first direction and the second direction is larger than the respective numbers of sub pixels for the other colors.

3. The display device according to claim 1, wherein, in the stereoscopic pixel, a total area of sub pixels for a color in each of the column and the row that include the vacant region is greater than respective total areas of sub pixels for the other colors.

4. The display device according to claim 1, wherein, in the stereoscopic pixel, in each of the column and the row that includes the vacant region, sub pixels for colors other than a color of sub pixels which are located adjacent to the vacant region in the first direction and the second direction are not located.

5. The display device according to claim 1, wherein, in the stereoscopic pixel, in each of a column and a row that are respectively adjacent to each of the column and the row which include the vacant region, at least one sub pixel for each of red, blue, and green is located.

6. The display device according to claim 1, wherein, in the stereoscopic pixel, at least four sub pixels are arranged in each of the second direction and the first direction.

7. The display device according to claim 1, wherein a width of each sub pixel in each of the column and the row that includes the vacant region is smaller than widths of the other sub pixels.

8. The display device according to claim 1, wherein a width of each sub pixel in each of the column and the row that includes the vacant region is substantially the same as widths of the other sub pixels.

9. The display device according to claim 1, wherein at least one sub pixel that is switched to not generate light at least when a stereoscopic image is displayed is located adjacent to each sub pixel in each of the column and the row that includes the vacant region.

10. The display device according to claim 1, wherein the stereoscopic pixel includes at least one sub pixel for a color other than red, blue, and green.

11. The display device according to claim 10, wherein the color of the sub pixel other than red, blue, and green is at least either yellow or white.

12. The display device according to claim 1, wherein, in the stereoscopic pixel, the sub pixels are arranged such that sub pixels positioned substantially symmetrically with respect to a diagonal line extending from an upper left to a lower right or an upper right to a lower left in the stereoscopic pixel have the same color.

13. The display device according to claim 1, wherein, in the stereoscopic pixel, the sub pixels are arranged such that sub pixels positioned substantially point-symmetrically with respect to a specific position in the stereoscopic pixel have the same color.

14. The display device according to claim 1, wherein the sub pixels are arranged such that an arrangement order for red, blue and green in a predetermined direction of sub pixels in one of the pixel for the right eye and the pixel for the left eye is different from an arrangement order for red, blue and green in the predetermined direction of sub pixels in the other one of the pixel for the right eye and the pixel for the left eye.

15. The display device according to claim 1, wherein, starting from an upper left or an upper right in the stereoscopic pixel, at least one sub pixel for each of red, blue, and green is arranged in a predetermined color order in the second direction, and at least one sub pixel for each of red, blue, and green is arranged in the same order as the predetermined color order, in the first direction.

16. The display device of claim 1 wherein the first direction is vertical and the second direction is horizontal.

17. The display device of claim 1 wherein the first and second directions are orthogonal.

18. The display device of claim 1 wherein the first direction corresponds to a first orientation of the image display, and the second direction corresponds to a second orientation of the image display.

19. The display device according to claim 1, wherein the sub pixels which are located adjacent to the vacant region in the first direction and the second direction are sub pixels for one color of red, blue, and green.

20. The display device according to claim 19, wherein the sub pixels which are located adjacent to the vacant region in the first direction and the second direction are sub pixels for green.

21. A display device for displaying a stereoscopic image comprising a plurality of viewpoint images corresponding to a plurality of viewpoints, the display device comprising:

an image display having a plurality of stereoscopic pixels each comprising a plurality of viewpoint pixels, the stereoscopic pixels being arranged in a horizontal direction and in a vertical direction; and an image controller configured to control the image display, each of the plurality of viewpoint pixels being composed of a plurality of sub pixels that include at least sub pixels for a first basic color and a second basic color that serve as a base for expressing a color and at least one vacant region in which no sub pixel is located, two sub pixels for a same color being located, in each pixel, so as to be adjacent to the at least one vacant region in the horizontal direction and the vertical direction, and for each of the plurality of viewpoint pixels for the right eye and the left eye, the image controller being configured to perform switching control setting a vertical direction display mode and a horizontal direction display mode, the switching control upon setting the vertical direction display mode switching sub pixels in a column including the vacant region to not generate light, and switching all of sub pixels for colors other than a color of the sub pixels which are switched to not generate light to generate light, among sub pixels of each of the pixel for the right eye and the pixel for the left eye; and the switching control upon setting the horizontal direction display mode switching sub pixels in a row including the vacant region to not generate light, and switch all of sub pixels for colors other than a color of the sub pixels which are switched to not generate light, to generate light, among sub pixels of each of the pixel for the right eye and the pixel for the left eye.

22. A display device for displaying a stereoscopic image comprising a plurality of viewpoint images corresponding to a plurality of viewpoints, the display device comprising:

an image display having a plurality of stereoscopic pixels arranged in a horizontal direction and in a vertical direction; and an image controller configured to control the image display, each of the plurality of stereoscopic pixels comprising a plurality of regions arranged in the horizontal direction and in the vertical direction, the regions including a first region for a right eye and a second region for a left eye, the regions each including a plurality of sub pixels that include at least sub pixels for a first basic color and a second basic color that serve as a base for expressing a color and at least one vacant region in which no sub pixel is located, two sub pixels for a same color being located, in each pixel, so as to be adjacent to the at least one vacant region in the first direction and the second direction, and for each right eye region and each left eye region, the image controller being configured to perform switching control on a region-by-region basis, for sub pixels included in the regions present at predetermined intervals in the horizontal direction and in the vertical direction, the image controller upon the horizontal direction display mode being set, switching sub pixels in a row including the vacant region to not generate light and switching all of sub pixels for colors other than a color of the sub pixels which are switched to not generate light to generate light, among sub pixels of each of the pixel for the right eye and the pixel for the left eye, and upon the vertical direction display mode being set, switching sub pixels in a column including the vacant region to not generate light, and switching all of sub pixels for colors other than a color of the sub pixels which are switched to not generate light, to generate light, among sub pixels of each of the pixel for the right eye and the pixel for the left eye.

23. The display device according to claim 22, wherein each of the plurality of regions comprises a four-row four-column sub-pixel region.

24. A display device for displaying a stereoscopic image comprising an image for a right eye and an image for a left eye, the display device comprising:

an image display having a plurality of stereoscopic pixels each comprising a pixel for the right eye and a pixel for the left eye, the plurality of stereoscopic pixels being arranged in a horizontal direction and in a vertical direction, the pixels for the right eye and the pixels for the left eye each including at least one sub pixel for each of red, blue, and green arranged in the vertical direction and at least one vacant region in which no sub pixel is located, two sub pixels for a same color being located, in each pixel, so as to be adjacent to the at least one vacant region in the horizontal direction and the vertical direction;

an image controller configured to control the image display, the image controller being further configured to perform subpixel switching control for each pixel for the right eye and for each pixel for the left eye, the image controller being configured to turn certain subpixels off and turn certain other subpixels on, the image controller upon the vertical direction display mode being set, switching sub pixels in a column including the vacant region to not generate light, and switch all of sub pixels for colors other than a color of the sub pixels which are switched to not generate light to generate light, among sub pixels of each of the pixel for the right eye and the pixel for the left eye, and upon the horizontal direction display mode being set, switching sub pixels in a row including the vacant region to not generate light, and switching all of sub pixels for colors other than a color of the sub pixels which are switched to not generate light, to generate light, among sub pixels of each of the pixel for the right eye and the pixel for the left eye; and a region having a predetermined width being provided between the sub pixels arranged in the vertical direction in the pixel for the right eye and the sub pixels arranged in the vertical direction in the pixel for the left eye, and at least one sub pixel for only one of red, blue, and green being located in the region having the predetermined width.

25. The display device according to claim 24, wherein the image controller performs control for allowing or not allowing light generation, on the at least one sub pixel located in the region having the predetermined width.

26. The display device according to claim 24, wherein the number of the sub pixels located in the region having the predetermined width is less than the number of the at least one sub pixel for red, blue, or green arranged in the vertical direction.

* * * * *